US007817869B2

(12) United States Patent
Paniconi et al.

(10) Patent No.: US 7,817,869 B2
(45) Date of Patent: Oct. 19, 2010

(54) VARIABLE SUPPORT ROBUST TRANSFORM FOR MULTIPLE DESCRIPTION CODING

(75) Inventors: Marco Paniconi, Campbell, CA (US); James J. Carrig, Jr., San Jose, CA (US); Zhourong Miao, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1223 days.

(21) Appl. No.: 10/840,881

(22) Filed: May 7, 2004

(65) Prior Publication Data

US 2005/0249425 A1 Nov. 10, 2005

(51) Int. Cl.
*G06K 9/36* (2006.01)

(52) U.S. Cl. ........................................ 382/240; 341/50

(58) Field of Classification Search ................ 382/232, 382/240; 341/50

See application file for complete search history.

(56) References Cited

U.S. PATENT DOCUMENTS

| | | | |
|---|---|---|---|
| 5,557,684 | A | 9/1996 | Wang et al. |
| 5,973,745 | A | 10/1999 | Kondo |
| 5,995,668 | A | 11/1999 | Corset et al. |
| 6,141,453 | A * | 10/2000 | Banham et al. ............. 382/240 |
| 6,163,868 | A | 12/2000 | Kondo et al. |
| 6,212,235 | B1 | 4/2001 | Nieweglowski et al. |
| 6,233,017 | B1 * | 5/2001 | Chaddha ................ 375/240.12 |
| 6,272,253 | B1 * | 8/2001 | Bannon et al. .............. 382/236 |
| 6,351,494 | B1 | 2/2002 | Kondo |
| 6,553,141 | B1 * | 4/2003 | Huffman .................... 382/232 |
| 6,646,578 | B1 | 11/2003 | Au |
| 7,092,550 | B2 | 8/2006 | Xu |
| 7,120,308 | B2 * | 10/2006 | Guleryuz .................... 382/254 |
| 2003/0103681 | A1 | 6/2003 | Guleryuz |
| 2003/0169931 | A1 | 9/2003 | Lainema |
| 2005/0200733 | A1 * | 9/2005 | Malvar ....................... 348/272 |
| 2008/0109718 | A1 | 5/2008 | Narayanaswami |
| 2009/0006994 | A1 | 1/2009 | Forstall et al. |

OTHER PUBLICATIONS

European Search Report, EP 05 25 2494, Oct. 2, 2009, 4 pages.

Yao Wang, et al., "Image Reconstruction From Partial Subband Images And Its Application In Packet Video Transmission", Signal Processing. Image Communication, Elsevier Science Publishers, Amsterdam, NL, vol. 3, No. 2/03, (Jun. 6, 1991), pp. 197-229, XP000234964.

(Continued)

*Primary Examiner*—Vikkram Bali
*Assistant Examiner*—Eueng-Nan Yeh
(74) *Attorney, Agent, or Firm*—Blakely, Sokoloff, Taylor & Zafman LLP

(57) ABSTRACT

A multi-level transform generates descriptions containing compressed data that represents source data using a description generation operation and variable support filters for compaction at each level. The initial level filters the source data and each subsequent level operates on data filtered by a prior level. The description assignment and filtering at each level may vary to create different operating points for the multi-level transform. Each operating point may have a corresponding error recovery process. In one aspect, an error recovery process encodes additional descriptions that are combined with non-erroneous description data to provide error recovery of the data in missing or damaged descriptions. In another aspect, a multi-level transform is created by combining description generation and variable support filters at the various levels.

72 Claims, 15 Drawing Sheets

140
Intermediate system
101
Variable support robust transform
141
143
>EC
145

OTHER PUBLICATIONS

Jiro Katto, et al., "Cell Loss Protection Using Hierarchical Coding In Video Packet Communication", Electronics & Communications In Japan, Part I-Communications, Wiley, Hoboken, NJ, US, vol. 73, No. 10, (Oct. 1, 1990), pp. 52-61, XP000224951.

Arsura E., et al., "Multiple Description Coding Approach For Internet Video Delivery", Visual Communications And Image Processing; Jan. 21, 2002-Jan. 23, 2002; San Jose, XP030080503.

* cited by examiner

VARIABLE SUPPORT ROBUST TRANSFORM FOR MULTIPLE DESCRIPTION CODING

FIELD OF THE INVENTION

This invention relates generally to encoding and decoding of temporally coherent data, and more particularly to a transform for such encoding and decoding.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Sony Electronics, Inc., All Rights Reserved.

BACKGROUND OF THE INVENTION

Transmission of large amounts of temporally coherent data, such as images or video, across communication links generally requires encoding the source data. The encoding typically compresses the source data using a transform, such as a wavelet transform or lapped DCT (discrete cosine transform), that produces coefficients representing the source data. In addition, the encoding sub-samples the source data to create a number of streams, also referred to as channels. Each stream contains a set of descriptions, or packets, and represents the whole of the original source data but at a reduced fidelity. The source data may be compressed before the descriptions are generated, or the descriptions may be compressed after they are generated. One or more of the description streams are transmitted to a corresponding decoder through the link. The process of generating the descriptions is sometimes referred to as description generation or "packetization." The packets/descriptions described herein should not be confused with packets prepared according to a particular network transmission protocol, such as TCP/IP.

Because the communication links may be unreliable, typically some error recovery technique is employed to handle description loss or corruption during transmission, thus providing robustness to the transmission. Common recovery techniques include re-transmission protocols, error correction or channel coding, and interpolation recovery. Retransmissions introduce delay and so are not favored for real-time applications. For large burst errors, error correction/channel coding does not provide sufficient protection at low bit cost. Interpolation recovery techniques recover missing data from available surrounding data but are of limited when the surrounding data is also erroneous.

A multi-resolution/layered transmission method sends the descriptions that contain important information (i.e., low pass or anchor data) with a higher priority than those containing less important information. However, because descriptions/packets may be lost at random, and the network does not look inside the packets to discriminate important from less important packets, this approach provided limited robustness.

In a more robust encoding method (MD), the multiple descriptions have equal importance. Each description is encoded independently and carries some new information about the source data. The descriptions should, in principle, complement each other, such that any number of received descriptions/packets can be used to provide some useful reconstruction of the source. In addition, the MD approach supports a wider range of applications, such as, for example, networks that do not have priority support.

Traditionally the description generation and compression process have been considered as separate operations. The order of the operations and the specifics of each results in a trade-off between compression and robustness of the encoded data. FIGS. 1A and 1B illustrate two extreme points in a compression-robustness characterization space.

System A 100 of FIG. 1A first packetizes 103 the source data 101 into descriptions 105 and then transforms 107 the descriptions 105 into compressed descriptions 109. Thus, System A operates within description boundaries. Because System A 100 involves description generation (sub-sampling) in the time domain, correlation within a description is poor, i.e., neighboring pixels within a description correspond to pixels further apart in original domain, leading to poor error free-compression (error free signal-noise ratio of 31.34 dB). However, the error pattern is individual pixel loss (see pattern 109, which reflects 25% description loss), and so is amenable to time-domain interpolation recovery methods, such as classified LS (least-squares) filters. Thus, System A 100 provides poor error-free compression but has very little error propagation from packet/description loss.

System B 120 of FIG. 1B first transforms 123 the source data 101 into a compressed form 125 and then packetizes 127 the compressed data 125 into compressed descriptions 129. Thus, System B operates across description boundaries. Because System B transforms/filters the source data as a whole, and generates descriptions in the transform domain, it provides high error-free compression (SNR 36.13), i.e., transform/filtering is effective because of high pixel correlation. However, the error pattern is very difficult to handle (see pattern 131). There are strong localized error holes (from lost of essential anchor transform data), and spreading of the error from support of transform filters across the descriptions. Error recovery from the loss of a description relies strongly on channel coding. If the transform is lapped block transform, some recovery attempt (in the transform domain) related to the overlap of the transform may be possible. Thus, System B provides good error-free compression, but has very strong error propagation from packet/description loss.

SUMMARY OF THE INVENTION

A multi-level transform generates descriptions containing compressed data that represents source data using a description generation operation and variable support filters for compaction at each level. The initial level filters the source data and each subsequent level operates on data filtered by a prior level. The description assignment and filtering at each level may vary to create different operating points for the multi-level transform. Each operating point may have a corresponding error recovery process. In one aspect, an error recovery process encodes additional descriptions that are combined with non-erroneous description data to provide error recovery of the data in missing or damaged descriptions. In another aspect, a multi-level transform is created by combining description generation and variable support filters at the various levels.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
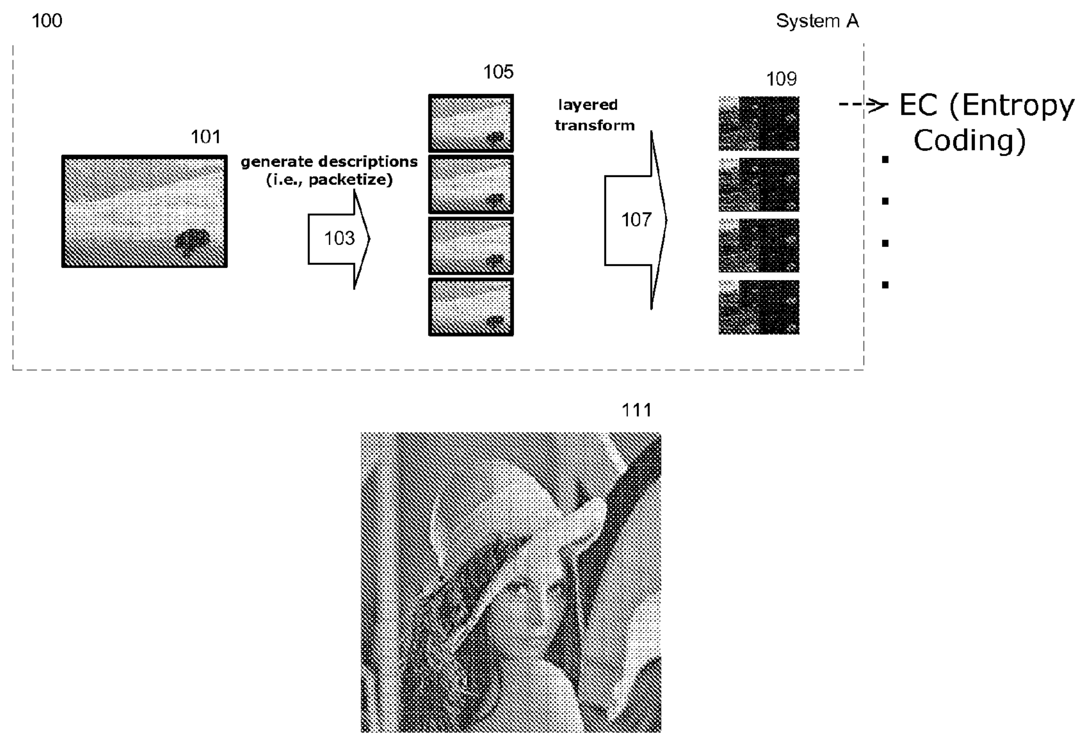
FIGS. 1A and 1B illustrate prior art encoding systems and resulting error patterns.
Figure 1B:
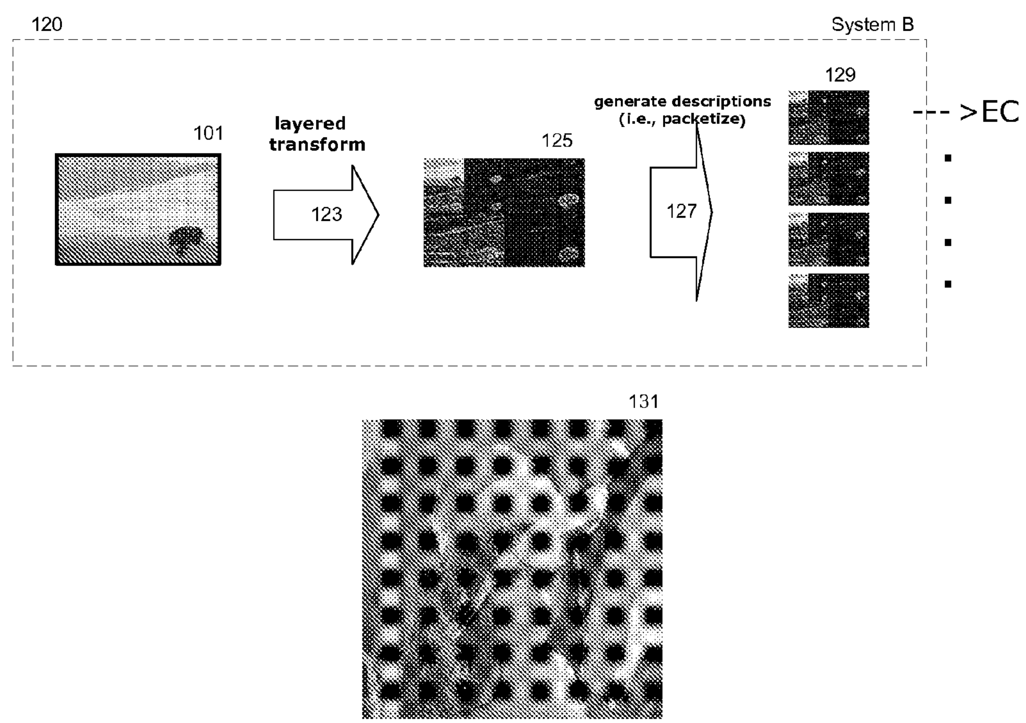
Figure 1C:
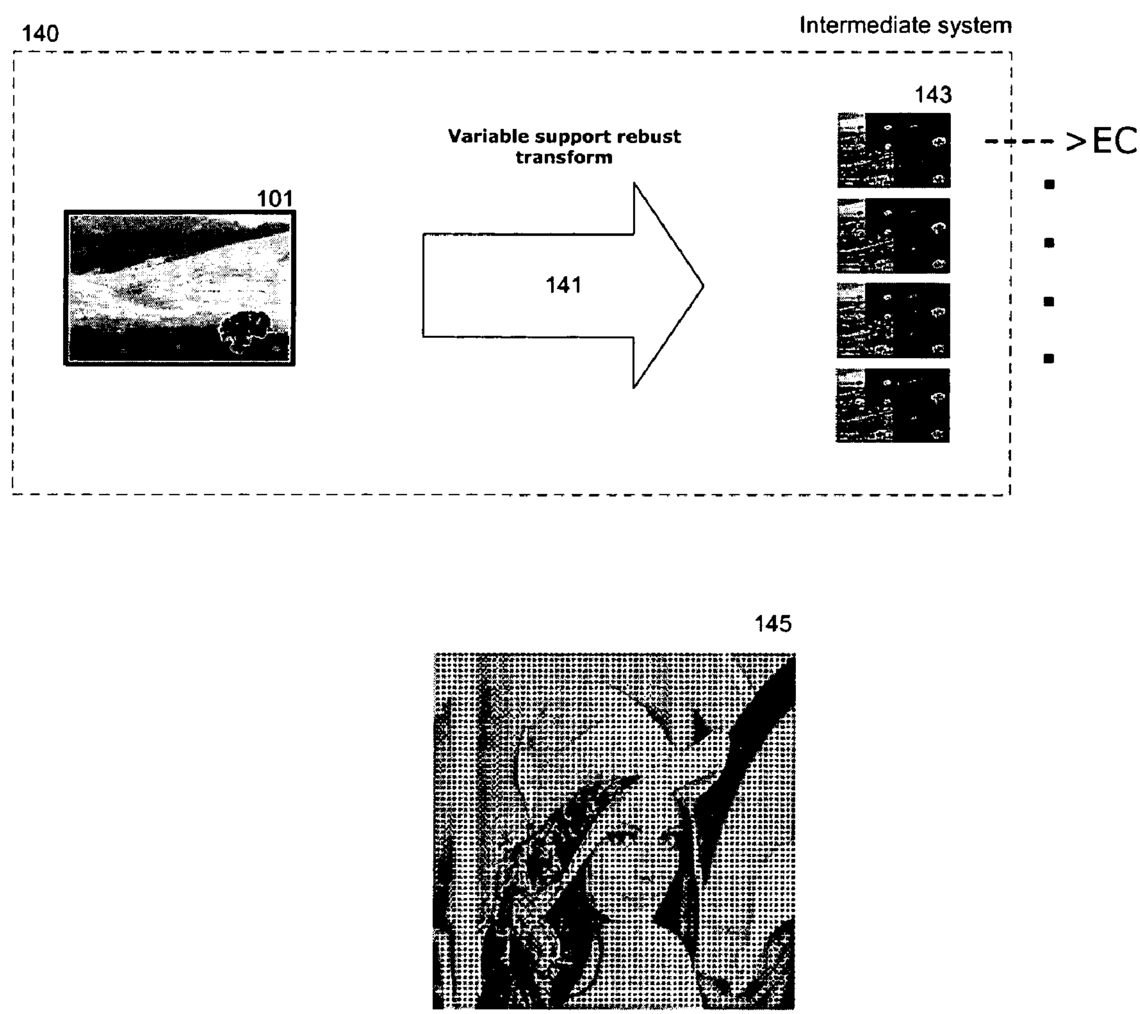
FIG. 1C illustrates an encoding system and resulting error pattern produced by one embodiment of a transform according to the present invention.

FIG. 1C illustrates a multi-level variable support robust (VSR) transform that merges the compression and description generation operations into a single transform to produce encoded data that falls between the encoded data of System A and System B in a compression-robustness characterization space. The filters that compress the source data 101 have variable support within and across description boundaries at every level of the transform and may be different at different levels of the transform. The filters at each level (which may be of de-correlating or correlating nature) are characterized by their variable pixel support (i.e., on which pixels/data the filter acts on) and therefore are linked to the description generation. The linking of the filtering and description generation at each level enables creation of a wider class of intermediate systems that produce encoded data 143 exhibiting different tradeoffs of compression and robustness, also referred to herein as "operating points" of the VSR transform. Each intermediate system 140 may be coupled with a recovery methodology specific to the characteristics of its compression and error pattern. For example, one embodiment of an operating point for the VSR transform 141 provides fairly good error free-compression (SNR 34.93) and an error pattern (see pattern 145) that is similar to System A. Transform 141 uses a multi-stage lifting filter at all levels and links the variable support filtering (for compression) and description generation together at each level. For recovery from description loss, a combination of adaptive time-domain interpolation after a number of intermediate inverse transformation levels with a form of channel coding is used.

FIG. 1C illustrates a multi-level variable support robust (VSR) transform that merges the compression and description generation operations into a single transform to produce encoded data that falls between the encoded data of System A and System B in a compression-robustness characterization space. The filters that compress the source data have variable support within and across description boundaries at every level of the transform and may be different at different levels of the transform. The filters at each level (which may be of de-correlating or correlating nature) are characterized by their variable pixel support (i.e., on which pixels/data the filter acts on) and therefore are linked to the description generation. The linking of the filtering and description generation at each level enables creation of a wider class of intermediate systems that produce encoded data exhibiting different tradeoffs of compression and robustness, also referred to herein as "operating points" of the VSR transform. Each intermediate system may be coupled with a recovery methodology specific to the characteristics of its compression and error pattern. For example, one embodiment of an operating point for the VSR transform 141 provides fairly good error free-compression (SNR 34.93) and an error pattern (see pattern 145) that is similar to System A. Transform 141 uses a multi-stage lifting filter at all levels and links the variable support filtering (for compression) and description generation together at each level. For recovery from description loss, a combination of adaptive time-domain interpolation after a number of intermediate inverse transformation levels with a form of channel coding is used.

Figure 2A:
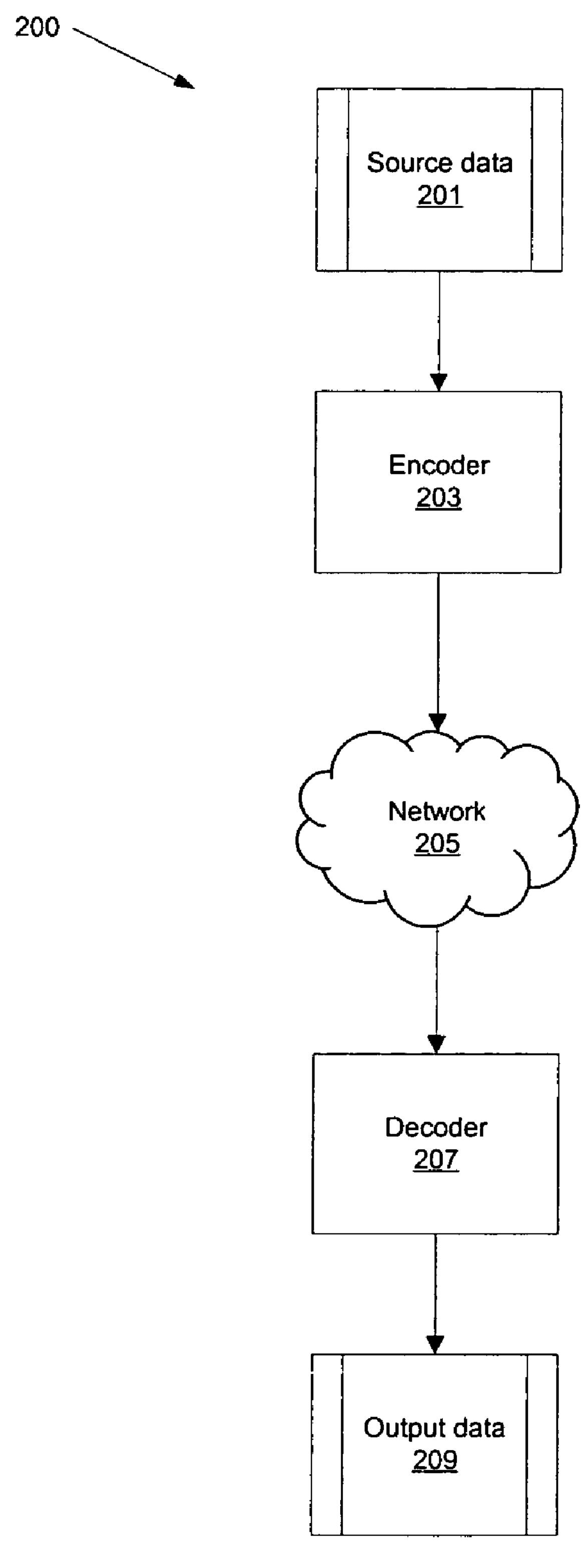
FIG. 2A is a diagram illustrating a system-level overview of encoded data transmission.

FIG. 2A illustrates a transmission system 200 utilizing encoding and decoding according to one embodiment of the present invention. Source data 201 is encoded by encoder 203 and transmitted through a communication link, illustrated as network 205. Encoder 203 is described in more detail in conjunction with FIG. 2B. Decoder 207 decodes the received encoded data into output data 209. Decoder 207 is described in more detail in conjunction with FIG. 2C. Loss of descriptions during transmission creates errors in output data 209. Therefore, the encoder 203 and decoder 207 may incorporate error recovery techniques that are further described in conjunction with FIGS. 2D and 2E. The encoder 203 and/or the decoder 207 may be implemented in a general purpose computer system as described further below in conjunction with FIG. 6B or in a device particularly configured to perform the functions described herein. The communications link may be a public or private connection, and the connection may be client-server or peer-to-peer as described further below in conjunction with FIG. 6A.

Figures 2B, 2C:
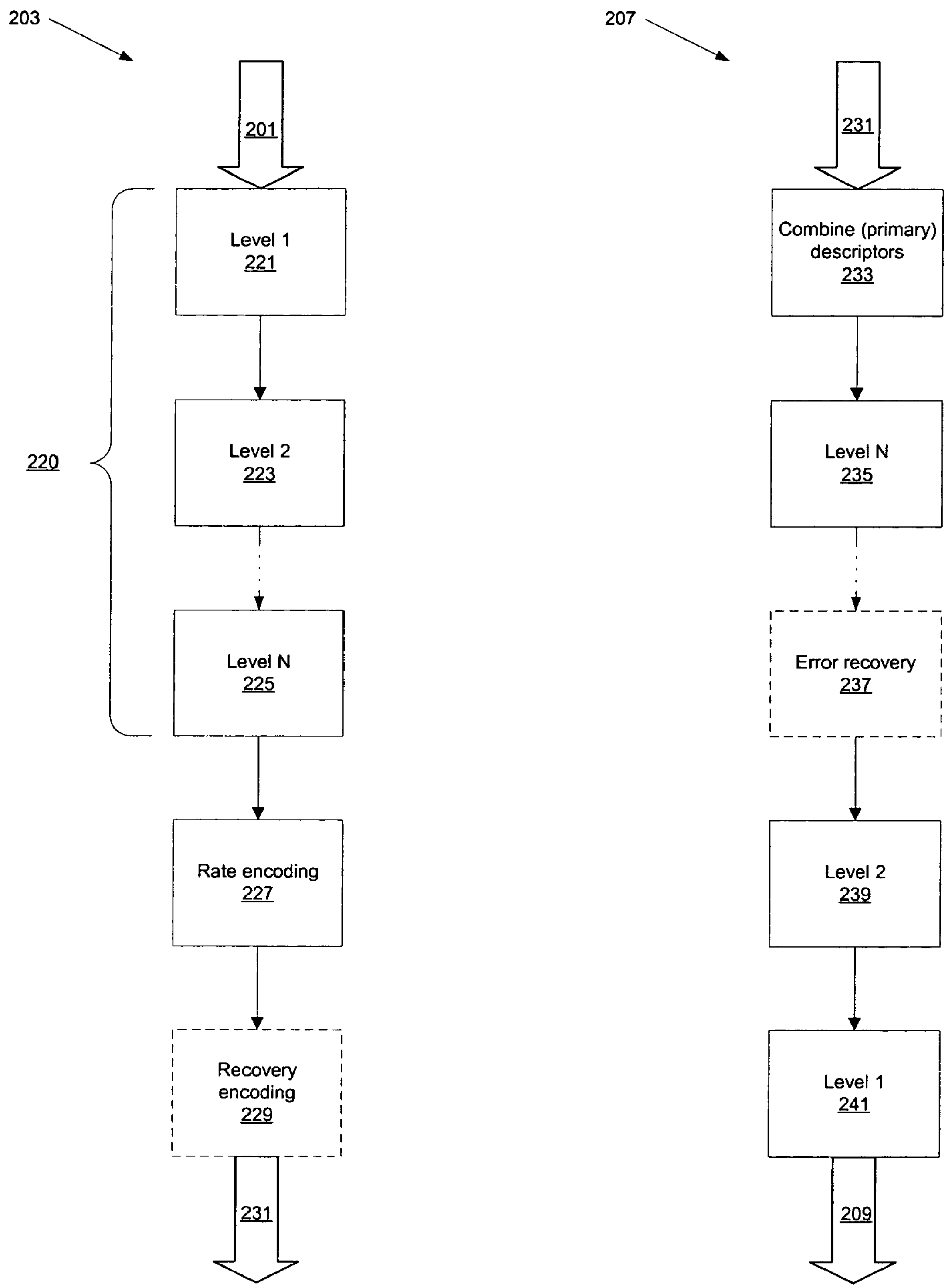
FIG. 2B is a flow diagram illustrating one embodiment of an encoder shown in FIG. 2A.
FIG. 2C is a flow diagram illustrating one embodiment of a decoder shown in FIG. 2A.

As illustrated in FIG. 2B, the encoder 203 incorporates an embodiment of the multi-level VSR encoding transform 220 and an optional recovery encoding 229. At encoding level 1 221, the source data 201 is filtered to compact it. The filtering also produces predictor data that is packetized into a set of intermediate descriptions. The compacted data from level 1 221 are passed to level 2 223, where it is filtered and the corresponding predictor data packetized into another set of intermediate descriptions. The process continues through a pre-determined number of N levels, with level N 225 outputting a set of final descriptions containing the compacted data and predictor data from level N 225, along with the intermediate descriptions from the previous levels. The final descriptions are rate encoded 227 into encoded descriptions 231 before transmission as is standard practice.

The decoder 207 shown in FIG. 2C incorporates decoding levels that correspond to the encoding levels of the encoder 203 to produce the output data 209. The decoder receives the encoded descriptions 231, combines them into an image, and each decoding level N 235, level 2 239 and level 1 241 applies the inverse of the corresponding level of the VSR encoding transform to the data in the packets passed to it.

Figure 2D:
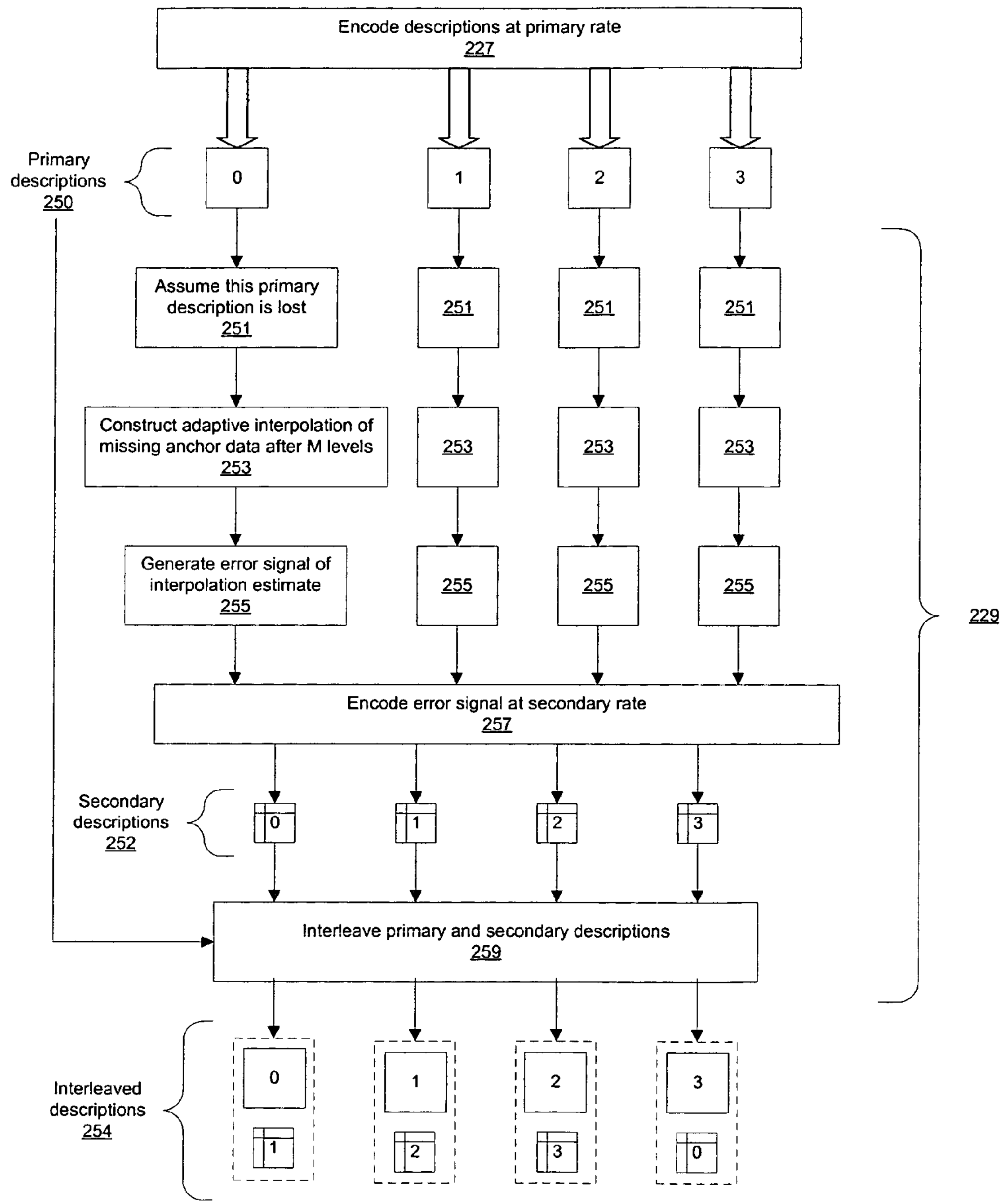
FIG. 2D is a flow diagram illustrating one embodiment of recovery encoding optionally performed by the encoder of FIG. 2B.

Turning now to FIG. 2D, if the encoder 203 includes optional recovery encoding 229, the rate encoding 227 encodes the final descriptions at a primary rate, producing "primary" descriptions 250. For each primary description 250, the recovery encoding 229 assumes loss of the description (block 251) and constructs an adaptive interpolation of the data in the primary description as it would appear after M of the N levels of the transform 220 (block 252). For example, if the transform 220 incorporates five levels, N=5, then the recovery encoding 229 could construct an adaptive interpolation of the primary description after the first two levels, M=2. The recovery encoding 229 generates an error signal for the interpolation estimate (block 255), which it encodes at a secondary rate (block 257) to produce "secondary" descriptions 252. Each secondary description 252 corresponds to one particular primary description 250. Additionally the magnitude of the interpolation error may also be reduced using the predictor data corresponding to the primary at block 255 to reduce the secondary encoding. An interleaving process 259 combines the primary and secondary descriptions into interleaved descriptions 254. Each interleaved description contains a primary description and a secondary description corresponding to a different primary description. In one embodiment illustrated in FIG. 2D, the interleaved descriptions 254 contain the secondary description corresponding to the next primary description, with the last interleaved description containing the secondary description corresponding to the first (0) primary description. Other interleaving schemes are contemplated and are within the scope of the invention. The resulting interleaved descriptions 254 are subsequently transmitted as a data stream. The recovery for a particular operating point is described in detail further below.

Figure 2E:
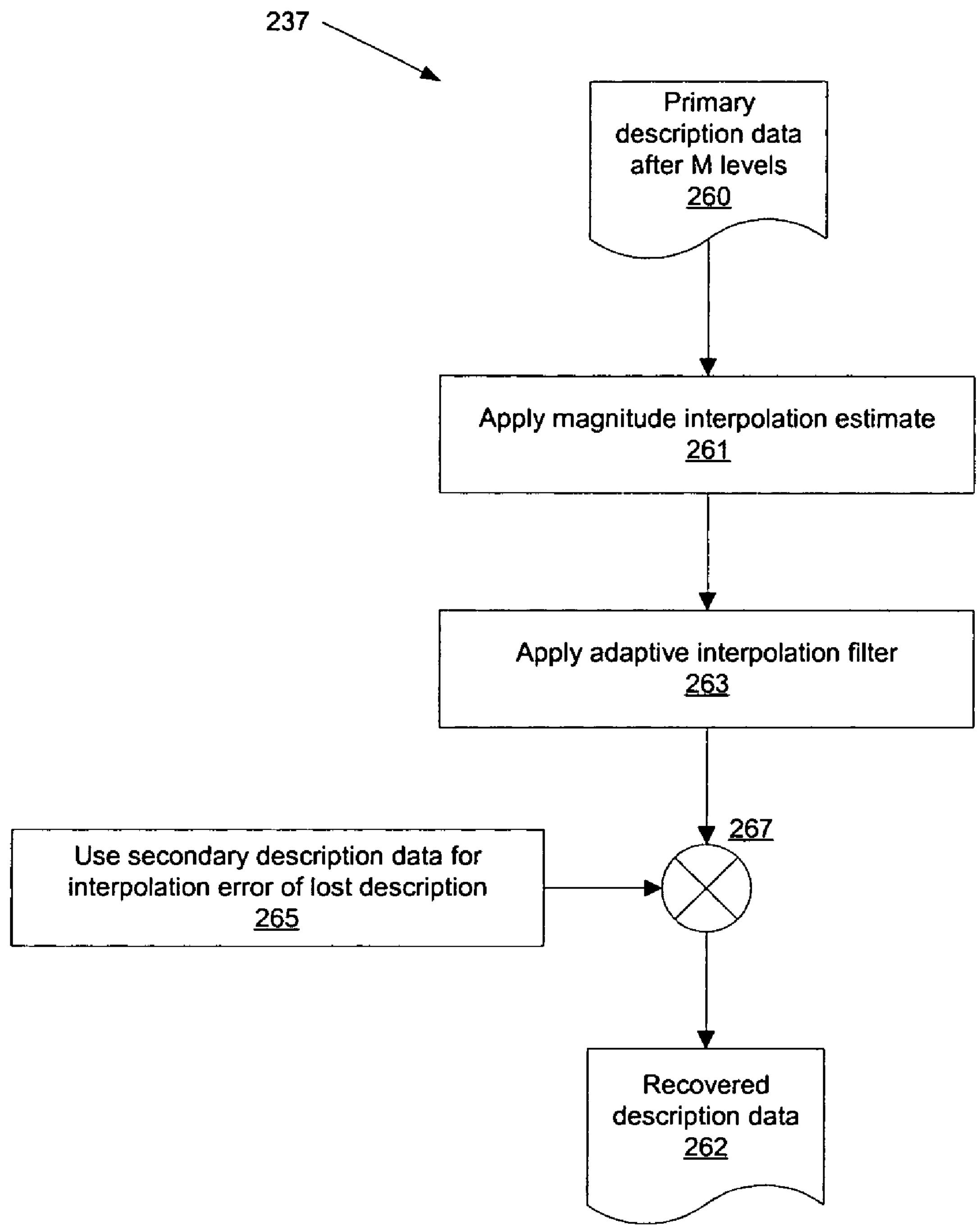
FIG. 2E is a flow diagram illustrating one embodiment of error recovery optionally performed by the decoder of FIG. 2C.

To recover from errors in transmission of interleaved descriptions 254, the decoder 207 extracts the primary descriptions 220 from the interleaved descriptions and combines them into a image at block 233 in FIG. 2C. The data is processed through N-M number of decoding levels and sent to an error recovery process 237. As illustrated in FIG. 2E, the error recovery process 237 receives the description data after the M inverse transform levels (block 260), applies a magnitude interpolation estimate based on the received predictor data corresponding to the lost/erroneous primary description (block 261) and an adaptive interpolation filter (block 263) to the received primary description data to construct an estimate of the data from the lost/erroneous primary description. The secondary description data 265 corresponding to an erroneous primary description is combined 267 with the output of block 263 to produce recovered description data 262. The recovered description data 262 is sent to the next decoding level. It will be appreciated that the value of M is the same as the corresponding value used by the recovery encoding 229 of FIG. 2B. FIG. 2C illustrates the process when M=2 as in the example given above.

In practice, the processes illustrated in FIGS. 2B-E may constitute one or more programs made up of machine-executable instructions. Describing the processes with reference to the FIGS. 2B-E enables one skilled in the art to develop such programs, including such instructions to carry out the operations (acts) represented by the logic blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the processes illustrated in FIGS. 2B-E without departing from the scope of the invention and that no particular order is implied by the arrangement of logic blocks shown and described herein.

The variable support robust transform combines the description generation and compression operations and hence enables the generation of new intermediate systems the with better compromises between error-free compression and recovery to packet loss. A corresponding new recovery for the new intermediate systems also may be developed in relation to the VSR transform. In general, the corresponding recovery combines adaptive interpolation and secondary description coding as described above. Specific systems generated by embodiments of the VSR transform and the corresponding recovery algorithms are described further below.

FIGS. 3A-G illustrate the general structure and processing of the VSR transform with reference to pixels of an image as exemplary source data. The transforms shown in FIGS. 3A-B have three levels, with low pass and high pass filtering being applied at each level. The low pass is performed first, and the high pass is generated based on the low pass data as is standard in a lifting scheme, i.e., a standard update followed by prediction. At each level, the filtering operation is repeated on the low pass data from the previous level to form a conventional wavelet decomposition. This type of low pass and high pass filtering is well-known, and is used merely for illustration without limiting the invention. Each output description comprises low pass data at the final level of the VSR transform and the corresponding high pass data at each level. To simplify illustration, in FIGS. 3B, 3D and 3F, the data support (lines/arrows connecting data) is shown for only some examples and only four descriptions are illustrated as being generated by the operating points. The support of the low pass is shown with solid lines; the support for the high pass with dotted lines. The resulting low pass data is illustrated by filled-in circles, and high pass data by open circles.

For the sake of clarity, the filtering at each level of one embodiment of the three-level transform is first described with reference to FIG. 3A, and then combined with an embodiment of description generation in FIG. 3B to produce an operating point that, from the view point of filtering support and description generation, is analogous to System B of FIG. 1B. FIG. 3C illustrates the error pattern resulting from losing a description generated by FIG. 3B. FIG. 3D illustrates the processing of an operating point of a embodiment of the VSR transform that produces output analogous to that System A of FIG. 1A; FIG. 3E illustrates the error pattern resulting from the loss of a description. It will be appreciated that the operating points illustrated in FIGS. 3B and 3D are only two particular examples of embodiments of the VSR transform. FIG. 3F illustrates the processing of an operating point of yet another embodiment of the VSR transform that produces output intermediate in compression-robustness to the operating points of FIGS. 3B and 3D; FIG. 3G illustrates the corresponding error pattern.

Figure 3A:
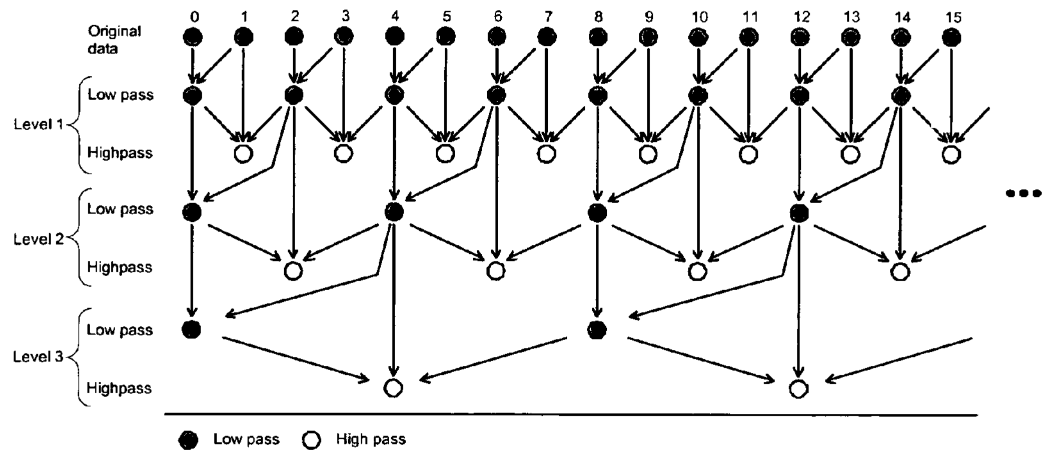
FIGS. 3A-G are diagrams illustrating the processing of alternate embodiments of the transform.
Figure 3B:
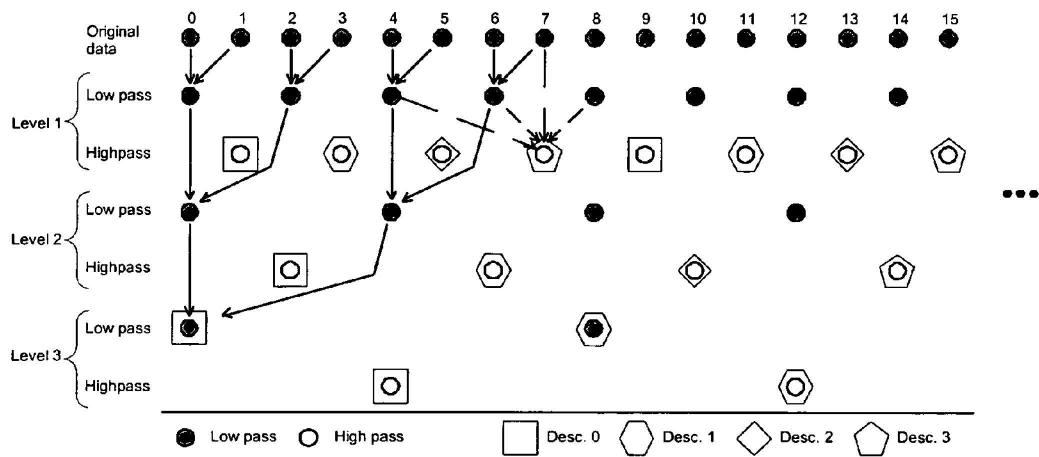
Figure 3C:
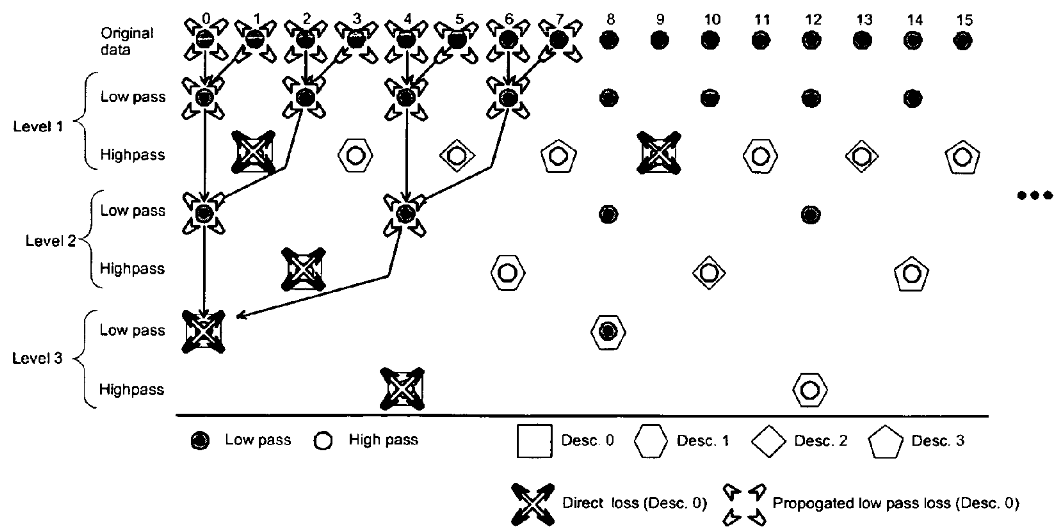
Figure 3D:
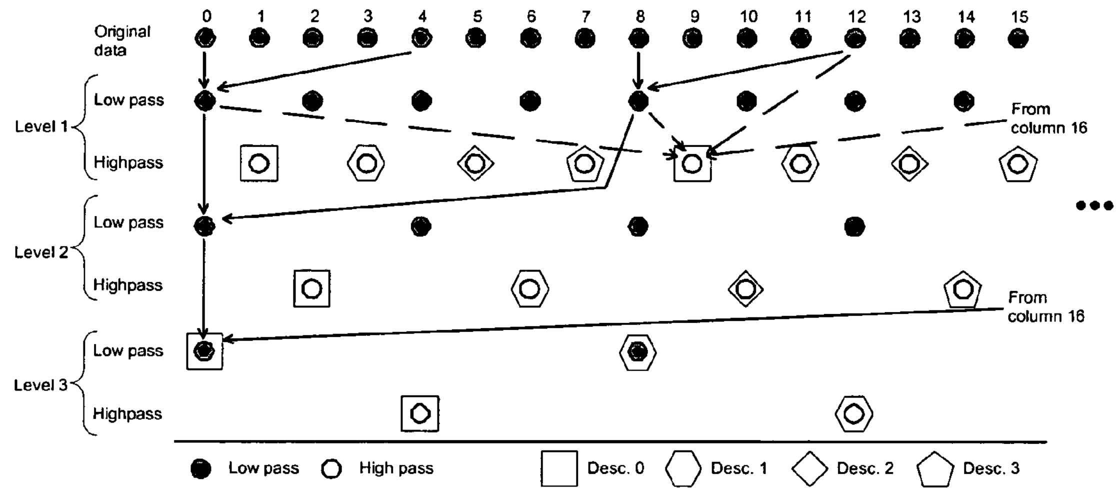
Figure 3E:
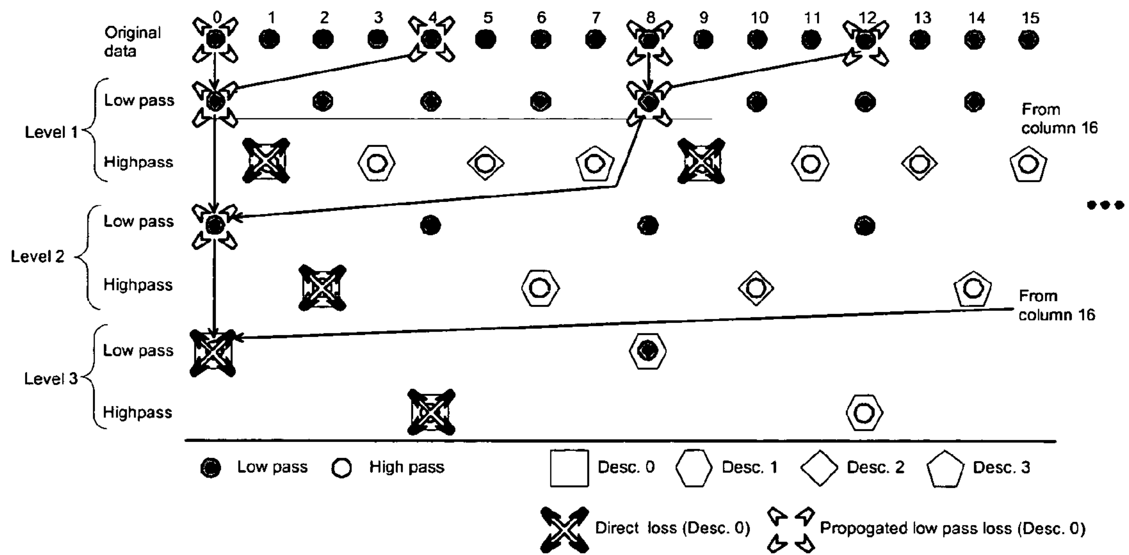
Figure 3F:
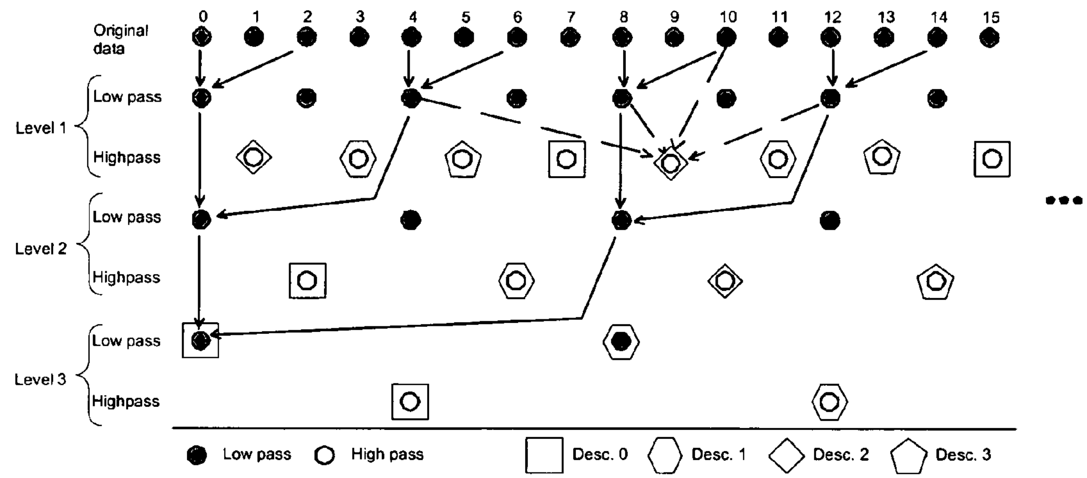
Figure 3G:
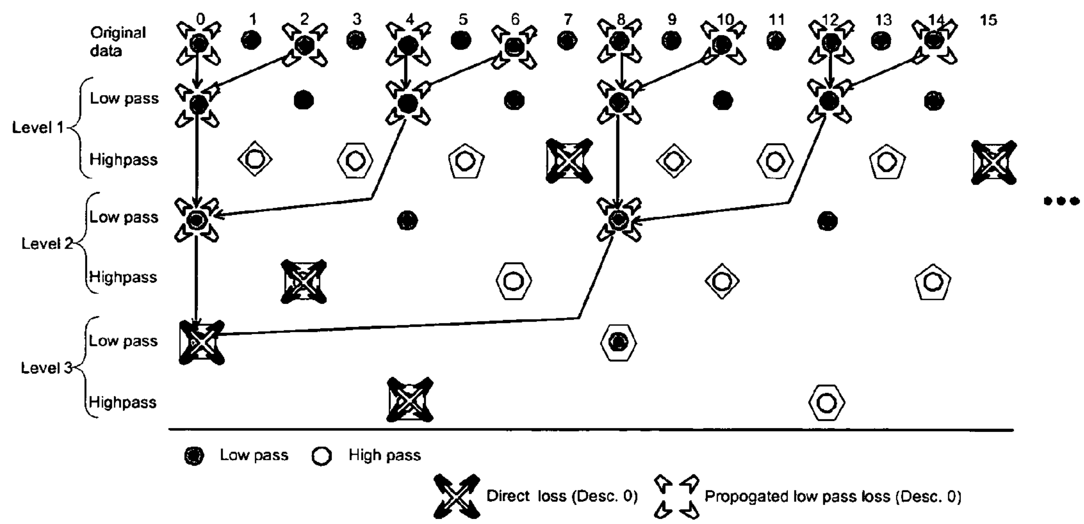

Beginning with FIG. 3A, the first low pass data point at Level 1 uses two data points (data 0 and 1) from the previous level (note that for Level 1 the previous level is the original or source data pixels). This type of low pass operation involves two data points from the previous level, assuming equal weight (i.e., ½, ½ average). Similarly the high pass data at a given level involves a predictor filter with support on the low pass data from the same level. The high pass data is the difference between a data point from the previous level and the prediction of this data point. This difference is usually a small signal (i.e., a residual). The better the predictor filter, the smaller the high pass data. For example, the first high pass data at Level 1 is the difference between the data point 1 (pixel from previous level) and a predictor filter. The predictor in this example uses the neighboring two low pass data points. This type of procedure is repeated for all pixels. After Level 1 the same procedure is repeated on the low pass data from the previous level.

In the embodiment of the VSR transform shown in FIG. 3B, the low pass and high pass filtering operate without any regard to description boundaries, just as System B generates the descriptions after the transform. Therefore neighboring pixel data is always used for filtering (which is very good for compression), and description generation for high pass data is a simple ordering at each level. The low pass always uses the two neighboring data from previous level, and the high pass (one example shown with dotted lines) uses three neighboring low pass data points for the predictor. Because filtering is done using neighboring pixel data, without any regard to description boundaries, there will be strong error propagation for a single description loss.

FIG. 3C shows error pattern arising from losing description 0. A thick dark cross/star symbol indicates the direct loss from description 0. Note that the direct loss is all the high pass data placed in description 0, and the low pass (at the final level) data placed in description 0. This direct loss propagates up to the original time domain as the transform is inverted (the inversion of the transform starts at final level and goes up to level 1, undoing the high and low pass operations). The prorogated loss is illustrated with a lighted symbol (empty star). The propagated loss comes from the support of the low pass data; there is also a smaller "soft" loss from the high pass data (not shown). The dominant error pattern in the original domain is from this propagated low pass loss. In FIG. 3C illustrates that the loss in the time domain involves eight consecutive pixels destroyed (it would be 32 for typical five-level transform). This type of error pattern is very difficult to recover using interpolation methods in time domain.

Now consider the embodiment of the VSR transform of FIG. 3D that generates descriptions in the time domain, and the filters in the transform operate only within each description, as does System A. Once again, assuming four descriptions, every fourth pixel in the original data (along the row direction) is first assigned to one of the descriptions (packetized) and then the filtering is performed on each description. Thus, the low pass and high pass filtering involves data points that are separated by four pixels, which results in poor compression. However, as shown in FIG. 3E, the error loss pattern resulting from, for example, losing description 0 is a sub-sampled loss pattern in time domain, e.g., every fourth pixel is destroyed. Because the low pass filtering skips three data points, the propagated loss will always have available (error-free) data between damaged data. Thus this operating point has very good recovery potential using an methodology, such as interpolation in time domain, that can be based on available neighboring data.

The operating points of FIGS. 3B and 3D can be viewed of as having a particular and fixed filtering support and description assignment at all levels of the transform. However, the filter support of low and high pass stages and the description assignment at each level may be varied to generate systems with different error loss patterns and error-free compression. The embodiment of the VSR transform illustrated in FIG. 3F involves filtering that skips over one pixel (or description). Again the low pass filter support is shown by solid lines, and the predictor (high pass) filter support by dotted lines, and both skip one data point. FIG. 3G shows the (dominant) error loss pattern which results from this particular embodiment of the VSR transform. Because the low pass skips one data point, the propagated low pass loss results in an error pattern in the time domain that is less favorable than System A but much more favorable than System B. Similarly, because the filtering skips over only one pixel, the compression performance will be a little worse than System B, but much better than System A.

Thus, the VSR transform varies the filter support relative to the description boundaries and incorporates description assignment at every level for high pass data. Although the VSR transform has been described in FIG. 3A-G using an image as the source data, one of skill in the art will readily appreciate that the invention is applicable to other types of temporally coherent data.

The mathematical details of the VSR transform are now described. Assume an embodiment in which the VSR transform has two outputs; one due to an update or low pass stage, and the other due to a predictor or high pass stage. The two output filters may also be a type of correlating transform, in which case the update and predictor may not correspond to low and high pass data. The two outputs of the filtering process are also referred to as outputs 1 and 2, and also as update (low pass) and predictor (high pass), respectively. Only a single level of the VSR transform is described. For the multi-level case, the same procedure is applied to the low pass data from the first level. The original data is designated as $x_i$, output 1 of the transform as $y_i$, and output 2 as $z_i$. The form of the 2-output transform is:

Output 1 (i.e., Update):

$$y_i = \sum_j L_{ij} x_j, \tag{1}$$

where $L_{ij}$ are the low pass model/filter parameters.

Output 2 (i.e., Prediction):

$$\hat{z}_i = \sum_j f_j y_j, \tag{2}$$

where $f_j$ are the predictor model/filter coefficients. In the case where this output is high pass data, the filter coefficients are determined by polynomial interpolation; $\hat{z}_i$ is then an estimate of $z_i$. The high pass data is then formed from the difference: $z_i-\hat{z}_i$.

The notation and structure for the VSR transform for a given level is as follows. Define $$t_i = \sum_j A_{ij} x_j \tag{3}$$

to split the input data into the two sets of data: the first set is the output $y_i$ and the second set is the data to be estimated (for predictor stage) $z_i$. The transformation above is the splitting and update stage of the lifting transform. The output of the A filter has $t_{i=even}=y_i$, $t_{i=odd}=z_i$. The even rows of $A_{ij}$ are the parameters $L_{ij}$, the odd rows just indicate the data set used for the second output (high pass). The filter matrix A in general is defined for whole system size, with suitable boundary constraints at the ends. That is, the update filter which may also generally be an overlapping filter, i.e., not confined to be block-type like the common (½, ½) update. Define a description assignment mapping for each level of the transform as $$pn=PM(t_i)$$

$$pn\epsilon 0,1,2 \ldots \text{number\_of\_descriptions} \tag{4}$$

where PM maps the data point $t_i$ to a description number (e.g., 0 to 3 for row transform with four descriptions along row). In the case where the transform is iterated only on the update data, the description index determines the description assignment for the high pass data at each level of the transform. In this case, the description assignment mapping for the update data is superfluous except at the final level.

Now consider the case where the predicted data is generated with polynomial interpolation. This is a very natural structure to use for residual generation, with flexibility for incorporation nonlinearity and adaptation via the order of the polynomial. For polynomial interpolation, use $$x_i = \sum_k n_{ik} a_k, \tag{5}$$

where $a_k$ are the polynomial coefficients, and $n_{ik}=|i|^k$ (reference is taken as the origin, i=0). The filter parameters $\{f_j\}$ are determined from polynomial interpolation, from the equations below:

$$\hat{t}_i = \sum_j f_j y_{2j} \tag{6}$$

where $\hat{t}$ is the estimate of t, and the high pass data becomes $t_i-\hat{t}_i$. This equation becomes (using equation 3, and the notation shown in FIG. 4)

$$\sum_k A_{ik}|k|^l = \sum_j f_j \sum_k A_{2jk}|k|^l \tag{7}$$

Figure 4:
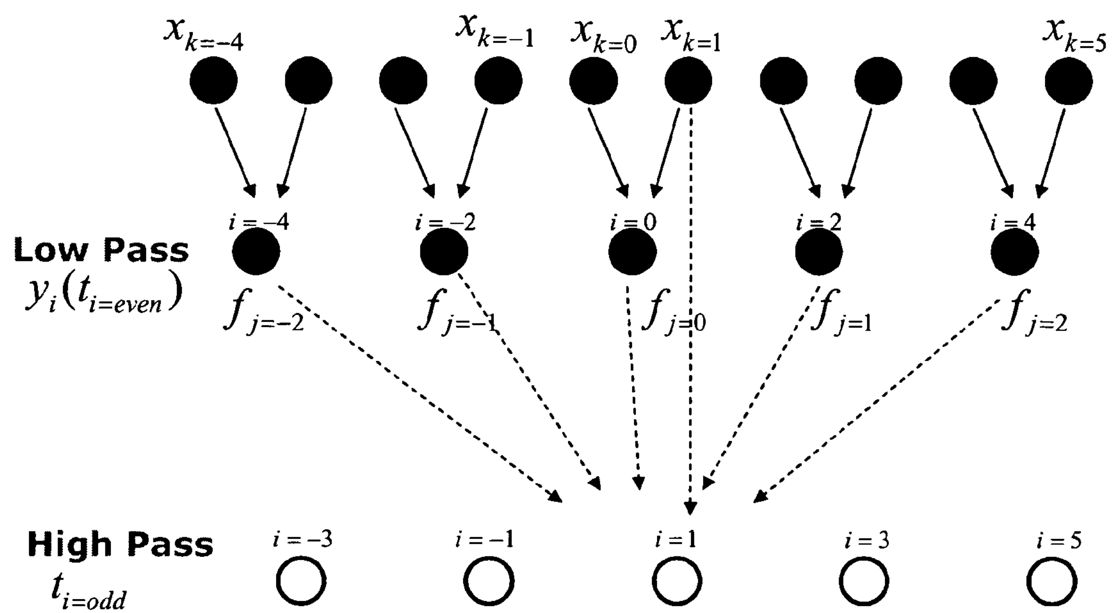
FIG. 4 is a diagram illustrating notations used in describing embodiments of the present invention.

Given the matrix A, the solution of the above equation yields the filter coefficients $\{f_j\}$. This is a n×n system of equations: l=0, 1 . . . n−1, where the range of the j index (e.g. for fifth order polynomial) is:

$$j = -\frac{n-1}{2}, -\frac{n-3}{2}, \ldots, 0, \ldots, \frac{n-3}{2}, \frac{n-1}{2},$$

where n is the order of the polynomial. The index j runs over the low pass data points $y_{2j}$, and the fixed (odd) index i above refers to the index of the prediction point (i.e., $z_i$). The j index is the application point of the filter on the low pass data, relative to center point (where prediction is taking place). Recall that the low pass data is the even numbered index. FIG. 4 illustrates the notation for fifth order polynomial with prediction at coordinate origin. Let $\{j_c\}$ refer to a particular ordering/running of the index. This defines the support of the predictor. For example, the following three embodiments are possible. Note that for a single-level VSN transform, skipping a pixel is like skipping a description.

Prediction Across All Descriptions: Assuming a fifth order polynomial, the j index would have the range $j_{c1}$=−2, −1, 0, 1, 2. This is analogous to System B.

Prediction Within Descriptions: For four descriptions (two along each direction), the j index would have the range $j_{c2}$=−4, −2, 0, 2, 4 (i.e., skip one description along each direction). For sixteen descriptions, the j index would have the range $j_{c3}$=−8, −4, 0, 4, 8 (i.e., skip 3 pixels/descriptions along each direction). This is analogous to System A.

Selective Prediction Relative to Description Assignment: An intermediate state with, for example, sixteen descriptions, the j index may have the range $j_{c3}$=−4, −2, 0, 2, 4. In this case every other pixel/description is skipped for prediction.

The constraint on the above transform coefficients (i.e., the A matrix) is that A is invertible. The matrix A is always invertible for the special case where:

For odd rows i: $A_{ik}$ is zero except for one column (to indicate location of high pass data); and For even rows i: $A_{ik}$ is zero, except for some index for the update pixel considered, and other columns k which have nonzero $A_{i,k}$ for odd i (i.e., the high pass data).

Since the above polynomial predictor is a function of only the update data, the conditions on the matrix A above are simply the case needed for the usual update-prediction step in the lifting transform.

It may also be desirable to have a linear phase constraint. The equation 7 above can be re-written as:

$$X_l = \sum_{\{j_c\}} f_{j_c} Y_{2j_c l} \tag{8}$$

where $$Y_{2jl} = \sum_k A_{2jk}|k|^l, \text{ and } X_l = \sum_k A_{1k}|k|^l.$$

The summation over k is over the original data index points as shown FIG. 4 above. The linear phase constraint is the condition:

$$\sum_{l,k} A_{1k}(Y_{2jl}^{-} + Y_{-2jl}^{-})|k|^{l} = 0 \text{ for } j = 0, 1, \ldots \frac{n-1}{2}. \tag{9}$$

This condition is not always satisfied for any state generated from the transform above (equation 8). For the usual case where $A_{ik}=\delta_{ik}$ for odd i (i.e., where the prediction point is just the sub-sampled point from original data), then the constraint becomes $$\sum_{l} (Y_{2jl}^{-} + Y_{-2jl}^{-}) = 0.$$

The previously described neighboring (½, ½) update with polynomial prediction satisfies this linear phase constraint.

In summary, the VSR transform has the following features. For a fixed description number, the transform is characterized by:

- The low pass filter parameters contained in A (recall the even rows are the update/low pass stage). These parameters determine the spreading of the dominant (low pass) error loss, and whether the error is contained within or across descriptions.
- The description assignment occurs at each level of the transform.
- The set $\{j_c\}$ which specifies the extent or support of the predictor relative to the description assignment. This controls whether (soft) error is spread within or across description boundaries.
- The order of the polynomial filter. This may be easily varied locally to improve prediction (i.e., compaction), or control error propagation (i.e., very short filters have less error spreading, longer ones may have better prediction but more error spreading if a description is lost).

The mathematical analysis presented above is for a single level. A multi-level transform repeats the process on the low pass data. At each level, all of the characteristics of the variable support transform (i.e., the description assignment, the support of the averaging and high pass filter, the order of the interpolator) can vary. Adaptability of these parameters can also be incorporated, such as for example, to adapt the parameters with respect to some joint measure of both error-free compression and robustness to description/packet loss condition. Various combinations of parameters may be automatically generated and tested to produce an operating point that satisfies a defined joint measure. The method that performs the automatic generation and testing on a processor is not illustrated herein but will be readily understood and reproducible by one of skill in the art.

Exemplary systems for a sixteen description case are now described in terms of single level VSR transforms. The process is characterized by the predictor support $\{j_c\}$ and the matrix A (which contains the support for the low pass filter and the data to be estimated for high pass stage). Subsequently, different systems created by combining the example cases below for five levels of the VSR transform are described. Note that, as explained above, for a single level transform, skipping a pixel in the support of the low (update) or high pass (predictor) filter is the same as skipping a description.

Case 1 involves a prediction point that skips over three descriptions, i.e., $j_c$= . . . −8, −4, 0, 4, 8, . . . . The update involves an average of points four pixels/descriptions apart. The filter matrix A is illustrated in Table 1. Because the support of the filters are completely contained within single description, this system exhibits good robustness but poor compression. This is case is referred to as System A.

TABLE 1

| | k = | | | | | | | | | | | | | | | |
|---|---|---|---|---|---|---|---|---|---|---|---|---|---|---|---|---|
| | −8 | −7 | −6 | −5 | −4 | −3 | −2 | −1 | 0 | 1 | 2 | 3 | 4 | 5 | 6 | 7 |
| −4 | | | 0.5 | | | | 0.5 | | | | | | | | | |
| −3 | | | | | | | 1 | | | | | | | | | |
| −2 | | | | 0.5 | | | | 0.5 | | | | | | | | |
| −1 | | | | | | | | 1 | | | | | | | | |
| i = 0 | | | | | | | | | 0.5 | | | | 0.5 | | | |
| 1 | | | | | | | | | | | | | 1 | | | |
| 2 | | | | | | | | | | 0.5 | | | | 0.5 | | |
| 3 | | | | | | | | | | | | | | 1 | | |

Case 2 is update and prediction done on neighboring data, i.e., $j_c$= . . . −2, −1, 0, 1, 2, . . . (prediction involves every point), and matrix A has the form shown in Table 2. This system involves prediction and update filters that spread across description boundaries, and thus has good compression, but strong error propagation. This case is referred to as system B.

TABLE 2

| | k = | | | | | | | | | | | | | | | |
|---|---|---|---|---|---|---|---|---|---|---|---|---|---|---|---|---|
| | −8 | −7 | −6 | −5 | −4 | −3 | −2 | −1 | 0 | 1 | 2 | 3 | 4 | 5 | 6 | 7 |
| −4 | | | | | 0.5 | 0.5 | | | | | | | | | | |
| −3 | | | | | | 1 | | | | | | | | | | |
| −2 | | | | | | | 0.5 | 0.5 | | | | | | | | |
| −1 | | | | | | | | 1 | | | | | | | | |
| i = 0 | | | | | | | | | 0.5 | 0.5 | | | | | | |

TABLE 2-continued

| | k = | | | | | | | | | | | | | | | |
|---|---|---|---|---|---|---|---|---|---|---|---|---|---|---|---|---|
| | −8 | −7 | −6 | −5 | −4 | −3 | −2 | −1 | 0 | 1 | 2 | 3 | 4 | 5 | 6 | 7 |
| 1 | | | | | | | | | | 1 | | | | | | |
| 2 | | | | | | | | | | | 0.5 | 0.5 | | | | |
| 3 | | | | | | | | | | | | 1 | | | | |

In case 3, referred to as System C, $j_c$= . . . −4, −2, 0, 2, 4 . . . so prediction is done using every other description (i.e., skip one description), and the update/low pass spreads across descriptions (but skips one description) with equal weight. The matrix A has the form shown in Table 3. This is an intermediate system falling between Systems A and B in the compression-robustness characterization space.

TABLE 3

| | k = | | | | | | | | | | | | | | | |
|---|---|---|---|---|---|---|---|---|---|---|---|---|---|---|---|---|
| | −8 | −7 | −6 | −5 | −4 | −3 | −2 | −1 | 0 | 1 | 2 | 3 | 4 | 5 | 6 | 7 |
| −4 | | | | | .5 | | .5 | | | | | | | | | |
| −3 | | | | | | | 1 | | | | | | | | | |
| −2 | | | | | | .5 | | .5 | | | | | | | | |
| −1 | | | | | | | | 1 | | | | | | | | |
| i = 0 | | | | | | | | | .5 | | .5 | | | | | |
| 1 | | | | | | | | | | | 1 | | | | | |
| 2 | | | | | | | | | | .5 | | .5 | | | | |
| 3 | | | | | | | | | | | | 1 | | | | |

Case 4, also referred to as System D, has $j_c$= . . . −2, −1, 0, 1, 2 . . . so that prediction is done across descriptions (every description included), and the update spreads across descriptions (but skips one description). The matrix A has the form shown in Table 4. For intermediate systems, the prediction and update must be more carefully tuned to each other. In this example, the unequal weights 0.75/0.25 are used to spread out the low pass data points more evenly and yield a more symmetric prediction filter (but not linear phase).

TABLE 4

| | k = | | | | | | | | | | | | | | | |
|---|---|---|---|---|---|---|---|---|---|---|---|---|---|---|---|---|
| | −8 | −7 | −6 | −5 | −4 | −3 | −2 | −1 | 0 | 1 | 2 | 3 | 4 | 5 | 6 | 7 |
| −4 | | | | | .75 | | .25 | | | | | | | | | |
| −3 | | | | | 1 | | | | | | | | | | | |
| −2 | | | | | | .25 | | .75 | | | | | | | | |
| −1 | | | | | | | | 1 | | | | | | | | |
| i = 0 | | | | | | | | | .75 | | .25 | | | | | |
| 1 | | | | | | | | | 1 | | | | | | | |
| 2 | | | | | | | | | | .25 | | .75 | | | | |
| 3 | | | | | | | | | | | | 1 | | | | |

Case 5, also referred to as System E, has $j_c$= . . . −4, −2, 0, 2, 4, . . . so that the prediction skips over 1 description, and update is across descriptions. Matrix A has the form shown in Table 5. By having the predictor skip over every other description, the error spreading is contained somewhat more allowing for possibly better recovery.

TABLE 5

| | k = | | | | | | | | | | | | | | | |
|---|---|---|---|---|---|---|---|---|---|---|---|---|---|---|---|---|
| | −8 | −7 | −6 | −5 | −4 | −3 | −2 | −1 | 0 | 1 | 2 | 3 | 4 | 5 | 6 | 7 |
| −4 | | | | | 0.5 | 0.5 | | | | | | | | | | |
| −3 | | | | | | 1 | | | | | | | | | | |
| −2 | | | | | | | 0.5 | 0.5 | | | | | | | | |
| −1 | | | | | | | | 1 | | | | | | | | |
| i = 0 | | | | | | | | | 0.5 | 0.5 | | | | | | |
| 1 | | | | | | | | | | 1 | | | | | | |
| 2 | | | | | | | | | | | 0.5 | 0.5 | | | | |
| 3 | | | | | | | | | | | | 1 | | | | |

Case 6, also referred to as System F, uses $j_c = \ldots -4, -2, 0, 2, 4 \ldots$ so that prediction is done using every other description (skip one description), and the update is an overlapping filter that spreads across descriptions with equal weight. The matrix A is illustrated in Table 6. In this case, the error-free compression is worse than using (0.5, 0.5) update (like case 2), but the overlapping nature of the update could improve the interpolation of missing low pass data.

TABLE 6

| | k = | | | | | | | | | | | | | | | |
|---|---|---|---|---|---|---|---|---|---|---|---|---|---|---|---|---|
| | −8 | −7 | −6 | −5 | −4 | −3 | −2 | −1 | 0 | 1 | 2 | 3 | 4 | 5 | 6 | 7 |
| −4 | | | | | .25 | .5 | .25 | | | | | | | | | |
| −3 | | | | | | | 1 | | | | | | | | | |
| −2 | | | | | | .25 | .5 | .25 | | | | | | | | |
| −1 | | | | | | | | 1 | | | | | | | | |
| i = 0 | | | | | | | | .25 | .5 | .25 | | | | | | |
| 1 | | | | | | | | | | 1 | | | | | | |
| 2 | | | | | | | | | | .25 | .5 | .25 | | | | |
| 3 | | | | | | | | | | | | 1 | | | | |

The labeling of the above systems as A, B, C, D, E characterizes the support of the update (low pass) filter and the support of the predictor (for high pass) filter. By varying the support of the filters (in addition the description assignment and the polynomial order may also vary) at each level of the VSR transform, different intermediate system having better trade-off of compression and robustness can be generated. The single level A, B, C, D and E systems described above may be combined to form various systems by changing the processing at the levels of a multiple-level VSR transforms. The error free SNR (signal/noise ratio) for five exemplary systems using a five-level VSR transform are shown in the following tables and compared with the error free SNR for five-level VSR transforms that incorporate only System A and System B-type levels. The SNR results are based on transforming the picture shown in FIGS. 1A-C at an encoding rate of 0.5 bpp (bits/pixel) for sixteen descriptions.

| | | | | | | | | | | | |
|---|---|---|---|---|---|---|---|---|---|---|---|
| 1 | B | 1 | B | 1 | B | 1 | D | 1 | E | 1 | D |
| 2 | B | 2 | B | 2 | E | 2 | D | 2 | E | 2 | D |
| 3 | C | 3 | A | 3 | A | 3 | C | 3 | A | 3 | A |
| 4 | A | 4 | A | 4 | A | 4 | C | 4 | A | 4 | A |
| 5 | A | 5 | A | 5 | A | 5 | C | 5 | A | 5 | A |
| 34.92 | | 34.39 | | 33.36 | | 32.50 | | 32.19 | | 31.39 | |

| | | | |
|---|---|---|---|
| 1 | A | 1 | B |
| 2 | A | 2 | B |
| 3 | A | 3 | B |
| 4 | A | 4 | B |

-continued

| | | | |
|---|---|---|---|
| 5 | A | 5 | B |
| 26.46 | | 35.80 | |
| System A | | System B | |

The operating point BBCCAA represented by first table shown above provides good compression and error pattern (recovery potential). A corresponding recovery encoding for the five-level BBCAA operating point, which has good error-free compression (34.92) and potential for recovery of description loss, is now described with reference to FIGS. 5A-C. The BBCAA operating point is characterized by:

1. At the first two levels of transform, filtering (low and high pass) operate across description boundaries (like system B).
2. In the later levels of the transform, the support of filters skip pixel locations/descriptions to contain error spreading and operate only with descriptions.
3. At Level 3, an update (low pass) is used that is intermediate in the sense that the update/low pass stage and predictor skip over a single description, i.e., system C above.
4. The order of the polynomial filter is small (1 or 3) at high levels of transform and hence predictor is basically contained within description boundaries. At the first two levels of the transform, the filter is longer (seven taps) and spreads across descriptions.
5. The description assignment to high pass data is offset from that of low pass data at Level 2.

Figure 5A:
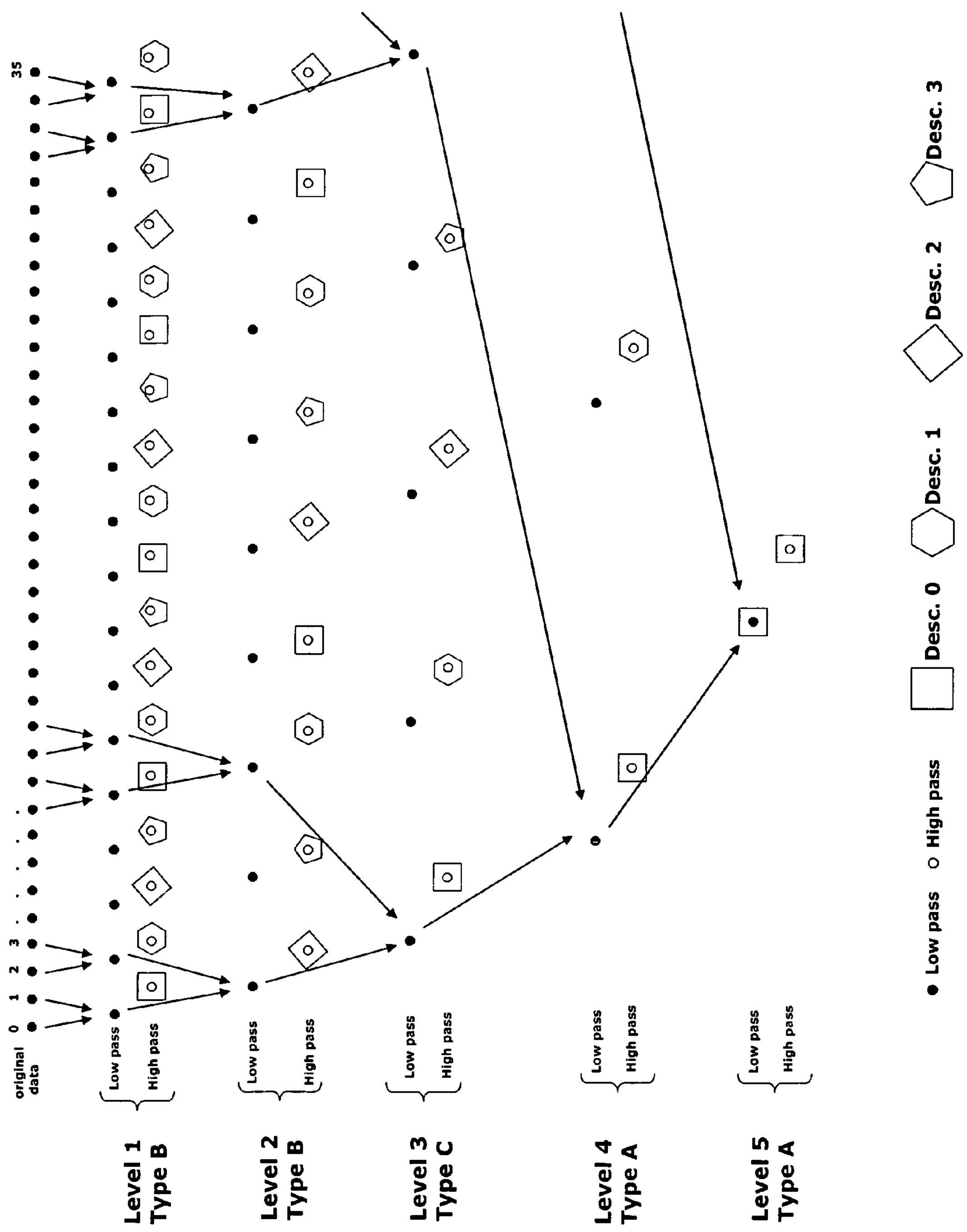
FIGS. 5A-C are diagrams illustrating the processing of further alternate embodiment of the transform.

Referring first to FIG. 5A, the BBCAA system is illustrated with four descriptions/packets in the horizontal direction. At each level, as in FIGS. 3A-F, lines connecting data points indicate low pass filtering. The filtering support for the high pass filter is not shown for sake of clarity. Note that the first two levels use update/low pass based on neighboring data, i.e., update does not skip any descriptions. This is the processing shown in FIG. 3B for System B. At the third level, the update skips one low pass data point, essentially skipping one description as previously described for System C and illustrated in FIG. 3E. In the last two levels, the updates skips the low pass data points, i.e., is all filtering is within a description as in System A (FIG. 3D). Note that the fifth level is only partially illustrated in FIG. 5A.

Figure 5B:
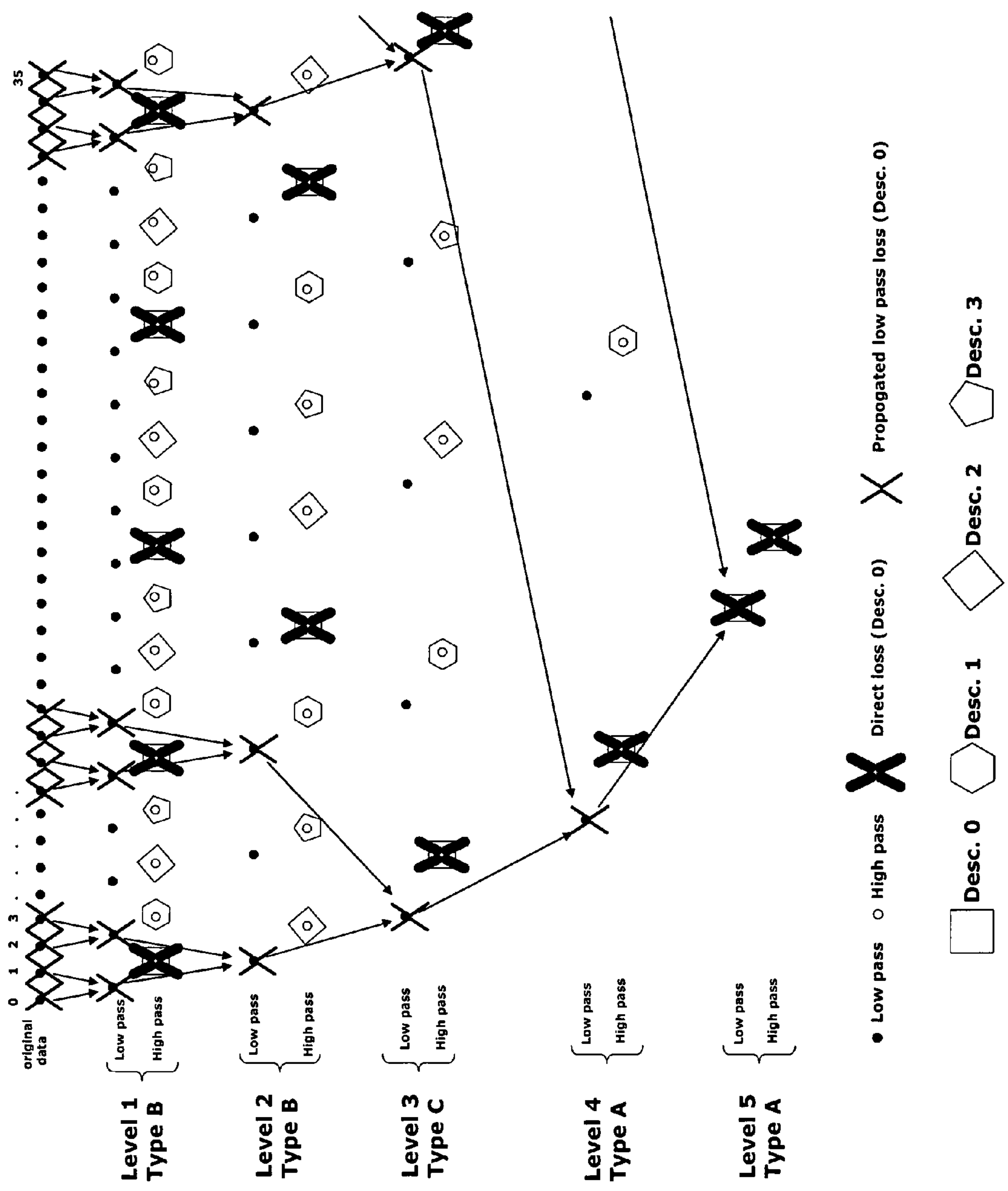

The corresponding dominant error loss pattern is shown in FIG. 5B. Consider a single description loss (description 0). The transform for the BBCAA operating point is such that at an intermediate level (low pass data at Level 2), the loss pattern is pixel based so that for each damaged low pass data, there is always some available error-free neighboring data. The neighboring data is error-free because (1) for Levels 4 and 5 all filtering is within a description (so there is absolutely no spreading of error across descriptions as Levels 5 and 4 are inverted during decoding), and (2) for Level 3, the low pass skips one description as in System C. In addition, the predictor for Level 3 is very short, so there is no error spreading from Level 3 to 2 when they are inverted. Strong error spreading occurs from Level 2 to 1 as the transform is inversed, and again from Level 1 to original domain. This is because in these first two levels of the transform, all the filtering is operating across description boundaries as in System B. The final dominant loss pattern in time domain is shown in top row of FIG. 5B.

Figure 5C:
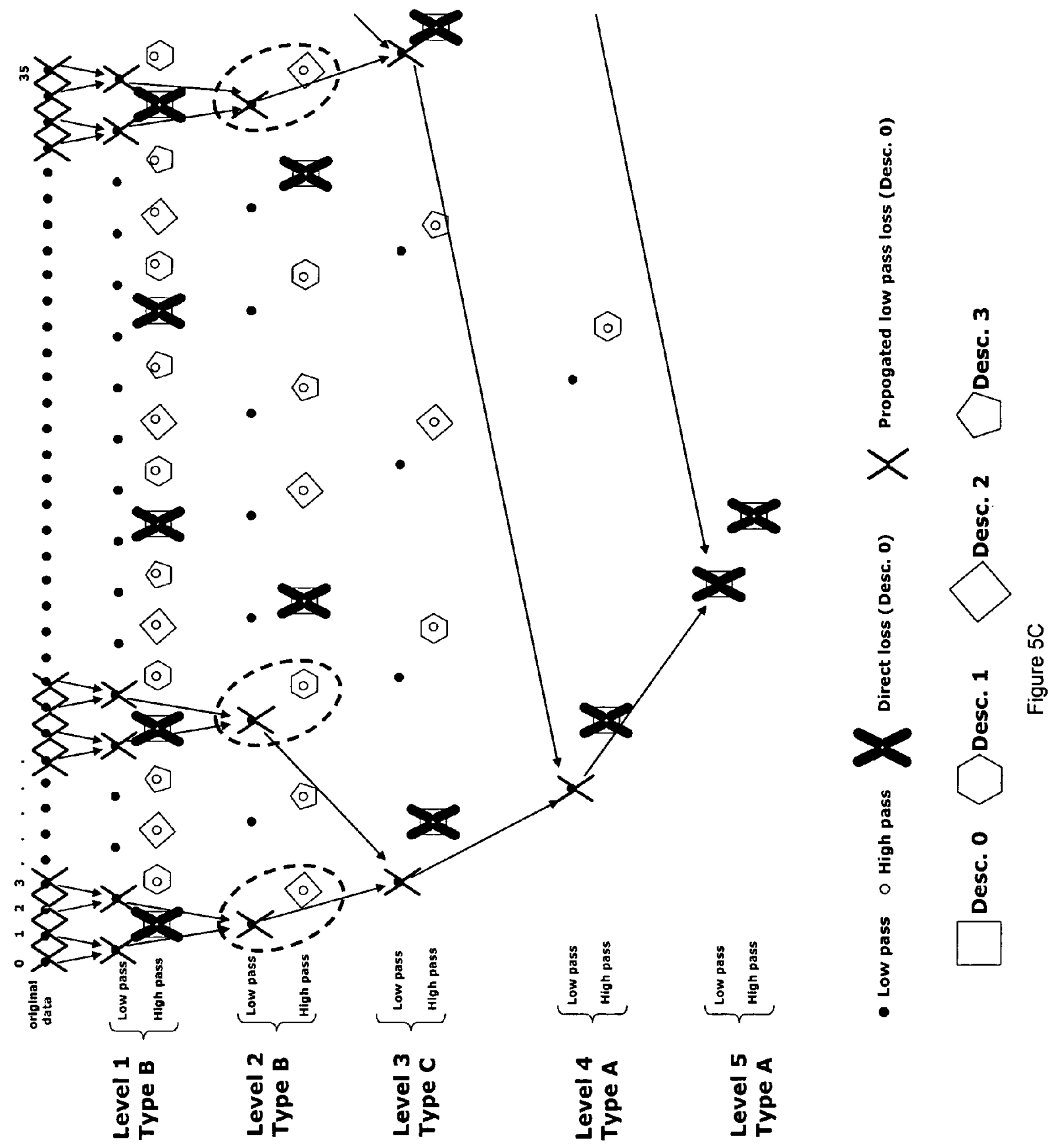

Given the characteristics of the error propagation of the BBCAA transform, the key to good recovery is to recover the low pass data at Level 2, i.e., after three inverse levels of the transform during decoding. As discussed above, error loss pattern at Level 2 is pixel based i.e., neighboring pixel data is available, and hence some interpolation recovery method is appropriate. If this data can be interpolated exactly, then the only remaining effect of error in original domain is high pass loss at Levels 1 and 2, which is small effect. Also note that the description assignment of the high pass data at Level 2 is shifted relative to Level 1 as shown in FIG. 5C. This shifting allows the use of high pass information corresponding to the lost low pass data in the recovery itself. Assuming single description/packet loss, the high pass loss that is shifted will be less noticeable, since the corresponding low pass data belongs to another description.

The particular recovery algorithm for the BBCAA transform uses an adaptive interpolation that interpolates low pass data at intermediate level (low pass data at Level 2 in FIG. 5A). That is, after three inversions of the transform, missing data, which is pixel based as discussed above, is interpolated. The interpolation uses one of the three classes for recovery. The three classes are U, H, V (uniform, horizontal, and vertical). In other words, the interpolation uses the nearest neighbor available error-free data with, for example: U=(¼, ¼, /¼, ¼), H=(½, ½), and V=(½, ½). This is explained further below. More complex classification may be used. This adaptive interpolation generates the interpolation error for the missing low pass data after three inversions of the BBCAA transform during decoding.

The interpolation error estimate, i.e., the difference between the true data and interpolated one is encoded at a smaller rate. This secondary-type encoding (secondary description) is packaged with a neighboring primary description and so is available to the decoder assuming non-consecutive description/packet loss. This is a type of channel coding.

As mentioned above, in reference to FIG. 5A, the description assignment of the high pass at Level 2 is offset so that the high pass data corresponding to the missing low pass data is available. This could be used to estimate the magnitude of the interpolation error. The filter is centered on the high pass data that corresponds to the missing low pass data as shown in FIG. 5C. The filter may be a LS (least-squares) filter, trained on the true magnitude of the interpolation error; the LS filter may also use some classes. It is natural to expect some correlation of the interpolation error to the high pass data, as these coefficients are themselves formed from a linear estimator/interpolator based on low pass data. Assuming the magnitude of the interpolation error can be reduced using available high pass data, then the secondary coding would only involve essentially the sign of the interpolation error, resulting in a smaller amount of information to encode.

The data flow through the encoder and decoder to recover lost descriptions from the BBCAA system is described with reference back to FIGS. 2B-E. Beginning with FIGS. 2B and 2D, the encoder receives the input image and applies the VSR transform 220 to generate the operating point BBCAA. The descriptions are encoded at some primary rate (block 227). For each description, the encoder assumes it is lost in transmission block 251, and for that lost description, it performs the recovery method, which applies the last three levels of inverse transform to the encoded data, and adaptive interpolation to recover the missing anchor (low pass) data at Level 2 (block 253). The interpolation error signal for the anchor data corresponding to lost description is constructed at block 255. The interpolation error signal is the true (error-free) data minus the interpolated data. The magnitude of the error signal may be further reduced by applying a filter on the nearest available high pass data. The final error signal (smaller description/packet of information) is encoded at some smaller rate to produce the secondary description at block 257. For transmission to decoder, the secondary description for a given description is grouped with the primary description of one of its neighbors at block 259. Therefore, for a given single description loss condition, the error signal for that loss is available to the decoder.

Turning to FIGS. 2C and 2E, the decoder receives the packet stream, i.e., the multiple descriptions 231, and combines the primary descriptions into a full size image (block 233). The inverse transform is applied for three levels, i.e., invert 5 to 4, 4 to 3, and 3 to 2. The decoder performs the estimate of the missing anchor data at block 237. The same procedure as the encoder is followed. The magnitude is estimated at block 261, and adaptive interpolation based on the same quantized data and classes is applied at block 263. The estimate of missing data is combined 267 with the received secondary encoding 265, which contains the encoding of the error signal. The remaining two inverse transform levels are applied (blocks 239 and 241).

The particular embodiment of the recovery procedure described above is configured to make optimal use of a combination of adaptive interpolation with some form of channel coding (the secondary encoding of error signal) to combine the best features of both types of recovery.

As is well-known, adaptive interpolation for low pass (anchor) data requires selection of the class information. The interpolation of missing data occurs at an intermediate level (after three inverse levels) of the inverse transform. The BBCAA transform is chosen such that single pixel error loss occurs only at this intermediate level. The missing data may be interpolated using polynomial interpolation having an order of 1 or 2: order 1 is simply (½, ½). The three classes U, H, V, are chosen based on decoded/quantized data as follows. Note that H refers to direction along i, and V refers to direction along j. Let $\hat{x}_{i,j}$ denote the quantized signal, and $y_{i,j}$ the interpolated value at pixel location (i,j). Then the class selection is determined as follows:

$$\text{If } |\hat{x}_{i,j+1} - \hat{x}_{i,j-1}| > |\hat{x}_{i+1,j} - \hat{x}_{i-1,j}| + T_1, \text{ class } H \text{ is chosen:} \quad (10)$$

$$y_{i,j} = \frac{\hat{x}_{i+1,j} + \hat{x}_{i-1,j}}{2} \text{ else if } |\hat{x}_{i+1,j} - \hat{x}_{i-1,j}| > |\hat{x}_{i,j+1} - \hat{x}_{i,j-1}| + T_2,$$

$$\text{class } V \text{ is chosen: } y_{i,j} = \frac{\hat{x}_{i,j+1} + \hat{x}_{i,j-1}}{2} \text{ else select class } U\text{:}$$

$$y_{i,j} = \frac{\hat{x}_{i,j+1} + \hat{x}_{i,j-1} + \hat{x}_{i+1,j} + \hat{x}_{i-1,j}}{4}.$$

The two thresholds ($T_1$, $T_2$) are selected by minimizing interpolation error (this is side info sent to decoder). The class selection above attempts to estimate/interpolate along an edge if it exists, otherwise it selects uniform average.

As described above, the recovery process uses an adaptive interpolation to recover missing anchor data at intermediate levels of decoding. The error signal, which is the interpolated signal minus error-free (true) data, is encoded at a (smaller) secondary rate. Results show the SNR for error-free case (no description loss), and recovered case for a loss of one out of sixteen descriptions (1/16 or 25% loss). The results of various combinations of primary and secondary encodings are set forth in Table 7:

TABLE 7

| Primary Rate | Secondary Rate | Total Rate (bpp) | SNR (error-free) | SNR (25% loss) |
|---|---|---|---|---|
| 0.5 | 0.0 | 0.5 | 34.92 | 33.40 |
| 0.48 | 0.02 | 0.5 | 34.74 | 33.60 |
| 0.47 | 0.03 | 0.5 | 34.65 | 33.68 |
| 0.45 | 0.05 | 0.5 | 34.20 | 33.57 |

Only primary encoding (0.5, 0.0) is the case where recovery method relies solely on adaptive interpolation at intermediate level of transform. The results show that the parameters can be tuned, i.e., tune the combination of the adaptive interpolation with secondary/channel coding, to obtain a more optimal system. For example, at (0.47, 0.03), where difference between error-free and recovered for 1/16 loss is smallest, generally the criteria for the tuned combination would be visual quality. Recall that the results for the prior art systems A and B are System A: SNR (error-free)=26.5 with good recovery, System B: SNR (error-free)=35.8 with very strong error propagation method (poor recovery potential).

Thus the BBCAA system performs very well in comparison, particularly when considering that there has been no attempt to expand on classes for adaptive interpolation or to optimize the secondary coding of the error signal, both of which are options contemplated as within the scope of the invention.

Figure 6A:
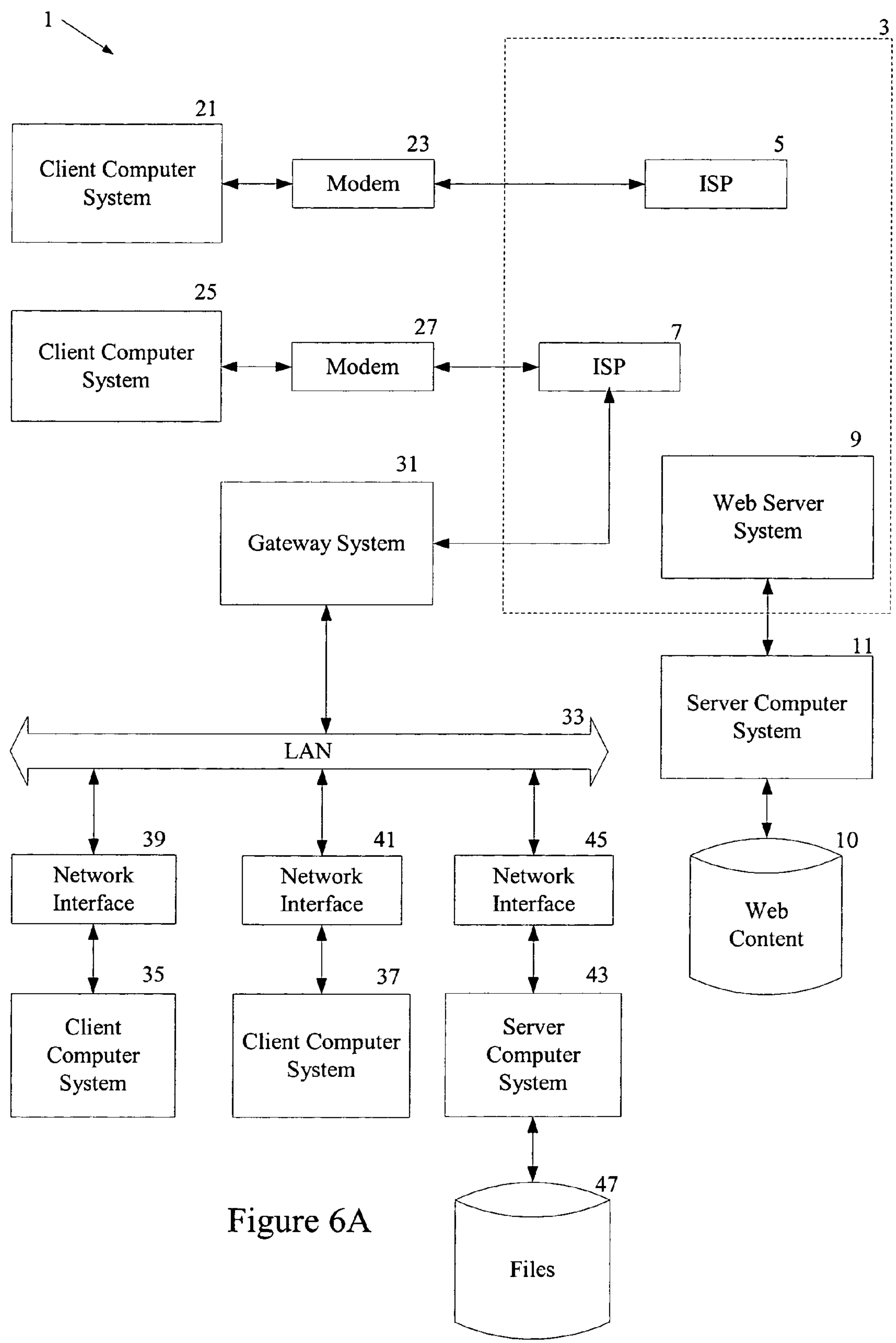
FIG. 6A is a diagram of one embodiment of an operating environment suitable for practicing the present invention.
Figure 6B:
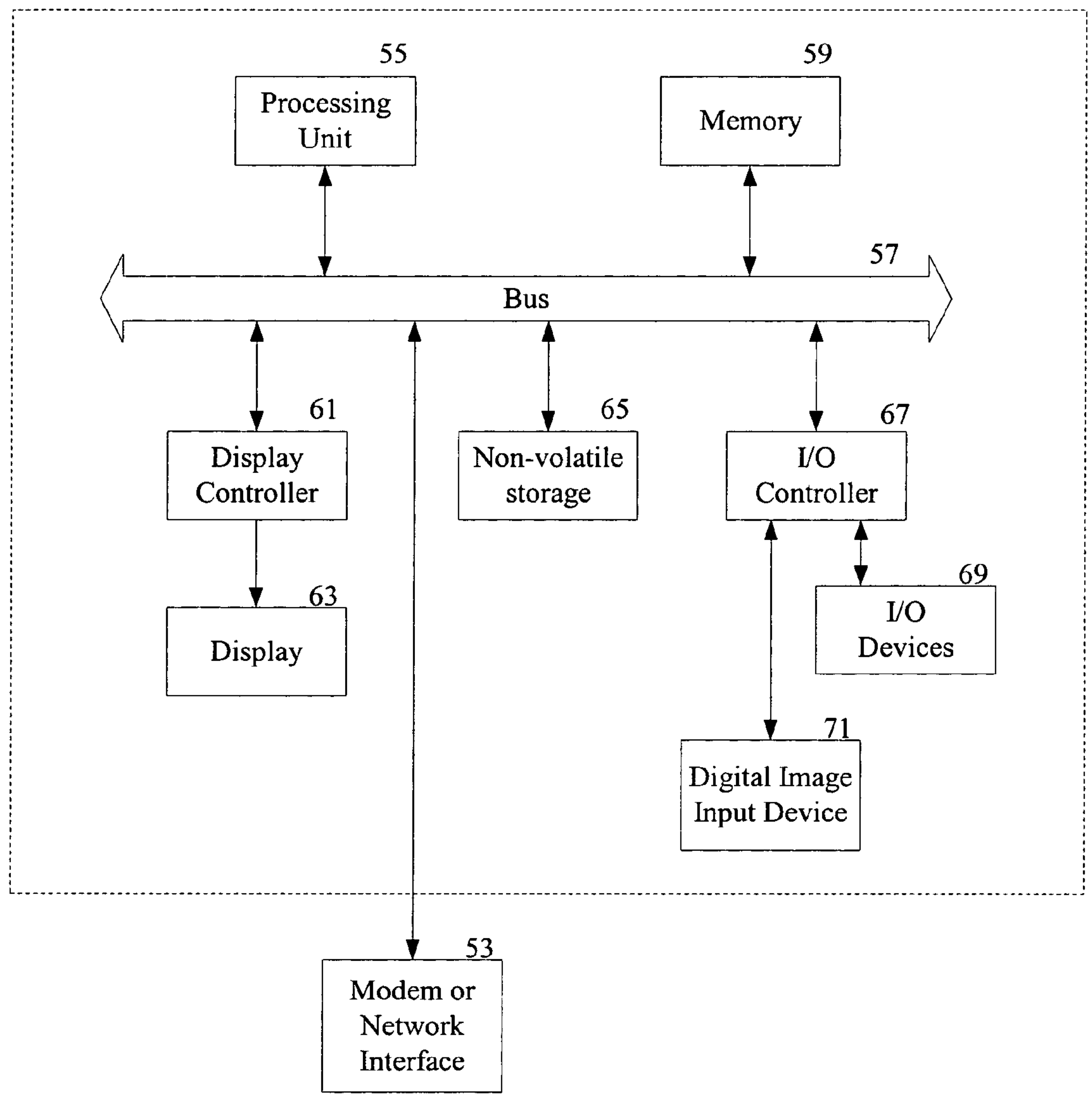
FIG. 6B is a diagram of one embodiment of a computer system suitable for use in the operating environment of FIG. 6A.

The following description of FIGS. 6A-B is intended to provide an overview of computer hardware and other operating components suitable for performing the processes of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network, such as peer-to-peer network infrastructure.

FIG. 6A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 6A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld device, or other such computer system. Similarly, the ISP 7 provides Internet connectivity for client systems 25, 35, and 37, although as shown in FIG. 6A, the connections are not the same for these three computer systems. Client computer system 25 is coupled through a modem interface 27 while client computer systems 35 and 37 are part of a LAN. While FIG. 6A shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31. Furthermore, any combination of client systems 21, 25, 35, 37 may be connected together through a peer-to-peer system using LAN 33, Internet 3 or a combination as a communications medium. Generally, a peer-to-peer system distributes data across a network of multiple machines for storage and retrieval without the use of a central server or servers. Thus, each peer may incorporate the functions of both the client and the server described above.

FIG. 6B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 6B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

A variable support robust transform for multiple description coding that merges the compression and description generation operations into a single transform with operating points that exhibit various compression-robustness characteristics has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the invention is applicable to any type of temporally coherent data and that images have been used for ease in description without limiting the scope of the invention. Furthermore, those of ordinary skill within the art will appreciate that the communication link between the encoder and decoder of the present invention may be based on any transmission medium, including the physical transferring of data on machine-readable medium. Therefore, it is manifestly intended that this invention be limited only by the following claims and equivalents thereof.

What is claimed is:

1. A computerized method comprising:

applying a multi-level transform to generate descriptions containing compressed data representing source data and further comprising predictor data from each level of the multi-level transform, wherein each level of the multi-level transform comprises a description generation operation and variable support filters for compaction, wherein one level of the transform generates descriptions from input data and compacts the input data by filtering within the generated descriptions and wherein the one level skips over a first number of description boundaries when compacting the input data, and wherein a subsequent level skips over a second number of description boundaries, and wherein the first number is different from the second number; and generating, by a computer, a secondary description corresponding to a primary description, the primary description comprising data output from a final level of the transform and the secondary description comprising an error signal associated with the primary description.

2. The method of claim 1, wherein input data for an initial level is the source data and input data for each subsequent level is data filtered by a previous level.

3. The method of claim 1 further comprising:

transmitting the descriptions generated by a final level over a communications link.

4. The method of claim 1 further comprising:

encoding the descriptions generated by a final level at a particular rate.

5. The method of claim 1, wherein a level compacts input data by filtering across description boundaries.

6. The method of claim 1 further comprising:

calculating the error signal based on an interpolation estimate of the primary description after a pre-determined number of levels of inverse transformation.

7. The method of claim 6 further comprising:

calculating the interpolation estimate by applying an adaptive interpolation filter after the pre-determined number of inverse transform levels.

8. The method of claim 6 further comprising:

calculating the interpolation estimate by applying a magnitude interpolation estimate based on prediction data after the pre-determined number of inverse transform levels.

9. The method of claim 1, wherein the primary description is encoded at a primary rate and generating a secondary description comprises encoding the error signal at a secondary rate.

10. The method of claim 1 further comprising:

interleaving the secondary description with a different primary description.

11. A computerized method comprising:

generating, by a computer, a secondary description corresponding to a primary description, the primary description comprising data output from a final level of a multi-level transform, each level of the transform comprises a description generation operation and variable support filters for compaction, and the secondary description comprising an error signal associated with the primary description, wherein the primary description and the secondary description contain compressed data representing source data and wherein one level of the transform generates descriptions from input data and compacts the input data by filtering within the generated descriptions and wherein the one level skips over a first number of description boundaries when compacting the input data, and wherein a subsequent level skips over a second number of description boundaries, and wherein the first number is different from the second number; and transmitting the secondary description interleaved with a different primary description, wherein the secondary description corresponds to a first portion of the source data and the different primary description corresponds to a different portion of the source data.

12. The method of claim 11 further comprising:

calculating the error signal based on an interpolation estimate of the data in the primary description after a pre-determined number of levels of inverse transformation.

13. The method of claim 11, wherein the primary description is encoded at a primary rate and generating a secondary description comprises encoding the error signal at a secondary rate.

14. The method of claim 11 further comprising:

estimating the data in an erroneous primary description; and combining the error signal in the corresponding secondary description with the estimate to recover the data in the erroneous primary description.

15. The method of claim 14, wherein estimating the data comprises:

applying a pre-determined number of levels of an inverse transform to a set of primary descriptions, the erroneous primary description being a member of the set.

16. The method of claim 15, wherein estimating the data further comprises:

applying an adaptive interpolation filter after applying the pre-determined number of levels of the inverse transforms.

17. The method of claim 15, wherein estimating the data further comprises:

applying a magnitude interpolation estimate after applying the pre-determined number of levels of inverse transforms, the magnitude interpolation estimate based on predictor data.

18. A computerized method comprising:

creating, by a computer, a multi-level transform, each level of the multi-level transform comprising a description generation operation and variable support filters to compact data filtered by a previous level, wherein an initial level filters source data and an final level generates descriptions containing compressed data representing the source data and further comprising predictor data from each level of the multi-level transform, wherein the descriptions comprise at least a secondary description corresponding to a primary description, the primary description comprising data output from a final level of the transform and the secondary description comprising and error signal associated with the primary description, wherein one level of the transform generates descriptions from input data and compacts the input data by filtering within the resulting descriptions and wherein the one level skips over a first number of description boundaries when compacting the input data and wherein a subsequent level skips over a second number of description boundaries and wherein the first number is different from the second number.

19. The method of claim 18, wherein a level is configured to compact input data by filtering across description boundaries.

20. The method of claim 18 further comprising:

configuring the multilevel transform to produce output having a pre-defined combination of compression and robustness characteristics.

21. The method of claim 18 further comprising:

determining a number of levels for the multilevel transform.

22. The method of claim 18 further comprising:

determining variable support filtering performed at each level;

determining description assignment performed at each level; and determining an arrangement combining the variable support filtering and the description assignments.

23. A computer-readable storage medium storing instructions which when executed by a data processing system cause the data processing system to perform a method that processes data, the method comprising:

applying a multi-level transform to generate descriptions containing compressed data representing source data and further comprising predictor data from each level of the multi-level transform, wherein each level of the multi-level transform comprises a description generation operation and variable support filters for compaction, wherein one level of the transform generates descriptions from input data and compacts the input data by filtering within the generated descriptions and wherein the one level skips over a first number of description boundaries when compacting the input data and wherein a subsequent level skips over a second number of description boundaries and wherein the first number is different from the second number; and generating a secondary description corresponding to a primary description, the primary description comprising data output from a final level of the transform and the secondary description comprising an error signal associated with the primary description; wherein the computer-readable storage medium is a non-transitory computer-readable storage medium.

24. The computer-readable storage medium of claim 23, wherein input data for an initial level is the source data and input data for each subsequent level is data filtered by a previous level.

25. The computer-readable storage medium of claim 23, wherein the method further comprises:

transmitting the descriptions generated by a final level over a communications link.

26. The computer-readable storage medium of claim 23, wherein the method further comprises:

encoding the descriptions generated by a final level at a particular rate.

27. The computer-readable storage medium of claim 23, wherein a level compacts input data by filtering across description boundaries.

28. The computer-readable storage medium of claim 23, wherein the method further comprises:

calculating the error signal based on an interpolation estimate of the primary description after a pre-determined number of levels of inverse transformation.

29. The computer-readable storage medium of claim 23, wherein the method further comprises:

calculating the interpolation estimate by applying an adaptive interpolation filter after the pre-determined number of inverse transform levels.

30. The computer-readable storage medium of claim 28, wherein the method further comprises:

calculating the interpolation estimate by applying a magnitude interpolation estimate based on prediction data after the pre-determined number of inverse transform levels.

31. The computer-readable storage medium of claim 23, wherein the primary description is encoded at a primary rate and generating a secondary description comprises encoding the error signal at a secondary rate.

32. The computer-readable storage medium of claim 23, wherein the method further comprises:

interleaving the secondary description with a different primary description.

33. A computer-readable storage medium storing instructions which when executed by a data processing system cause the data processing system to perform a method that processes data, the method comprising:

generating a secondary description corresponding to a primary description, the primary description comprising data output from a final level of a multi-level transform, each level of the transform comprises a description generation operation and variable support filters for compaction, and the secondary description comprising an error signal associated with the primary description, wherein the primary description and the secondary description contain compressed data representing source data and wherein one level of the transform generates descriptions from input data and compacts the input data by filtering within the generated descriptions and wherein the one level skips over a first number of description boundaries when compacting the input data and wherein a subsequent level skips over a second number of description boundaries and wherein the first number is different from the second number; and transmitting the secondary description interleaved with a different primary description, wherein the secondary description corresponds to a first portion of the source data and the different primary description corresponds to a different portion of the source data; wherein the computer-readable storage medium is a non-transitory computer-readable storage medium.

34. The computer-readable storage medium of claim 33, wherein the method further comprises:

calculating the error signal based on an interpolation estimate of the data in the primary description after a pre-determined number of levels of inverse transformation.

35. The computer-readable storage medium of claim 33, wherein the primary description is encoded at a primary rate and generating a secondary description comprises encoding the error signal at a secondary rate.

36. The computer-readable storage medium of claim 33, wherein the method further comprises:

estimating the data in an erroneous primary description; and combining the error signal in the corresponding secondary description with the estimate to recover the data in the erroneous primary description.

37. The computer-readable storage medium of claim 36, wherein estimating the data comprises:

applying a pre-determined number of levels of an inverse transform to a set of primary descriptions, the erroneous primary description being a member of the set.

38. The computer-readable storage medium of claim 37, wherein estimating the data further comprises:

applying an adaptive interpolation filter after applying the pre-determined number of levels of the inverse transforms.

39. The computer-readable storage medium of claim 37, wherein estimating the data further comprises:

applying a magnitude interpolation estimate after applying the pre-determined number of levels of inverse transforms, the magnitude interpolation estimate based on predictor data.

40. A computer-readable storage medium storing instructions which when executed by a data processing system cause the data processing system to perform a method that processes data, the method comprising:

creating a multi-level transform, each level of the multi-level transform comprising a description generation operation and variable support filters to compact data filtered by a previous level, wherein an initial level filters source data and an final level generates descriptions containing compressed data representing the source data and further comprising predictor data from each level of the multi-level transform, wherein the descriptions comprise at least a secondary description corresponding to a primary description, the primary description comprising data output from a final level of the transform and the secondary description comprising and error signal associated with the primary description, wherein one level of the transform generates descriptions from input data and compacts the input data by filtering within the resulting descriptions and wherein the one level skips over a first number of description boundaries when compacting the input data and wherein a subsequent level skips over a second number of description boundaries and wherein the first number is different from the second number;

wherein the computer-readable storage medium is a non-transitory computer-readable storage medium.

41. The computer-readable storage medium of claim 40, wherein a level is configured to compact input data by filtering across description boundaries.

42. The computer-readable storage medium of claim 40, wherein the method further comprises:

configuring the multilevel transform to produce output having a pre-defined combination of compression and robustness characteristics.

43. The computer-readable storage medium of claim 40 further comprising:

determining a number of levels for the multilevel transform.

44. The computer-readable storage medium of claim 40 further comprising:

determining variable support filtering performed at each level;

determining description assignment performed at each level; and determining an arrangement combining the variable support filtering and the description assignments.

45. A system comprising:

a processor coupled to a memory through a bus;

an encoding process executed from the memory by the processor to cause the processor to apply a multi-level transform to generate descriptions containing compressed data representing source data and further comprising predictor data from each level of the multi-level transform, wherein each level of the multi-level transform comprises a description generation operation and variable support filters for compaction, wherein one level of the transform generates descriptions from input data and compacts the input data by filtering within the generated descriptions and wherein the one level skips over a first number of description boundaries when compacting the input data and wherein a subsequent level skips over a second number of description boundaries and wherein the first number is different from the second number; and a generating process executed from the memory by the processor to cause the processor to generate a secondary description corresponding to a primary description, the primary description comprising data output from a final level of the transform and the secondary description comprising an error signal associated with the primary description.

46. The system of claim 45, wherein input data for an initial level is the source data and input data for each subsequent level is data filtered by a previous level.

47. The system of claim 46 further comprising a communications link coupled to the processor through the bus and wherein the encoding process further causes the processor to transmit the descriptions generated by a final level over the communications link.

48. The system of claim 45, wherein the encoding process further causes the processor to encode the descriptions generated by a final level at a particular rate.

49. The system of claim 45, wherein a level compacts input data by filtering across description boundaries.

50. The system of claim 49, wherein the encoding process further causes the processor to calculate the error signal based on an interpolation estimate of the primary description after a pre-determined number of levels of inverse transformation.

51. The system of claim 49, wherein the encoding process further causes the processor to calculate the interpolation estimate by applying an adaptive interpolation filter after the pre-determined number of inverse transform levels.

52. The system of claim 49, wherein the encoding process further causes the processor to calculate the interpolation estimate by applying a magnitude interpolation estimate based on prediction data after the pre-determined number of inverse transform levels.

53. The system of claim 45, wherein the primary description is encoded at a primary rate and the encoding processes further causes the processor to encode the error signal at a secondary rate when generating a secondary description.

54. The system of claim 45, where the encoding process further causes the processor to interleave the secondary description with a different primary description.

55. A system comprising:

a processor coupled to a memory through a bus; and a recovery process executed from the memory by the processor to cause the processor to generate a secondary description corresponding to a primary description, the primary description comprising data output from a final level of a multi-level transform, each level of the transform comprises a description generation operation and variable support filters for compaction, and the secondary description comprising an error signal associated with the primary description, wherein the primary description and the secondary description contain compressed data representing source data, wherein the recovery process further causes the processor to transmit the secondary description interleaved with a different primary description, wherein the secondary description corresponds to a first portion of the source data and the different primary description corresponds to a different portion of the source data and wherein one level of the transform generates descriptions from input data and compacts the input data by filtering within the generated descriptions and wherein the one level skips over a first number of description boundaries when compacting the input data and wherein a subsequent level skips over a second number of description boundaries and wherein the first number is different from the second number.

56. The system of claim 55, wherein the recovery process further causes the processor to calculate the error signal based on an interpolation estimate of the data in the primary description after a pre-determined number of levels of inverse transformation.

57. The system of claim 55, wherein the primary description is encoded at a primary rate and the recovery process further causes the processor to encode the error signal at a secondary rate when generating a secondary description.

58. The system of claim 55, wherein the recovery process further causes the processor to estimate the data in an erroneous primary description, and combine the error signal in the corresponding secondary description with the estimate to recover the data in the erroneous primary description.

59. The system of claim 58, wherein the recovery process further causes the processor to apply a pre-determined number of levels of an inverse transform to a set of primary descriptions, the erroneous primary description being a member of the set when estimating the data.

60. The system of claim 59, wherein the recovery process further causes the processor to apply an adaptive interpolation filter after applying the pre-determined number of levels of the inverse transforms when estimating the data.

61. The system of claim 59, wherein the recovery process further causes the processor to apply a magnitude interpolation estimate after applying the pre-determined number of levels of inverse transforms, the magnitude interpolation estimate based on predictor data when estimating the data.

62. A system comprising:

a processor coupled to a memory through a bus; and a configuration process executed from the memory by the processor to cause the processor to create a multi-level transform, each level of the multi-level transform comprising a description generation operation and variable support filters to compact data filtered by a previous level, wherein an initial level filters source data and an final level generates descriptions containing compressed data representing the source data and further comprising predictor data from each level of the multi-level transform, wherein the descriptions comprise at least a secondary description corresponding to a primary description, the primary description comprising data output from a final level of the transform and the secondary description comprising and error signal associated with the primary description, wherein one level of the transform generates descriptions from input data and compacts the input data by filtering within the generated descriptions and wherein the one level skips over a first number of description boundaries when compacting the input data and wherein a subsequent level skips over a second number of description boundaries and wherein the first number is different from the second number.

63. The system of claim 62, wherein the configuration process further causes the processor to configure a level to compact input data by filtering across description boundaries.

64. The system of claim 62, wherein the configuration process further causes the processor to configure the multi-level transform to produce output having a pre-defined combination of compression and robustness characteristics.

65. The system of claim 62, wherein the configuration process further causes the processor to determine a number of levels for the multilevel transform.

66. The system of claim 62, wherein the configuration process further causes the processor to determine variable support filtering performed at each level, determine description assignment performed at each level, and determine an arrangement combining the variable support filtering and the description assignments.

67. An apparatus comprising:

means for receiving source data;

means for applying a multi-level transform to generate descriptions containing compressed data representing the source data and further comprising predictor data from each level of the multi-level transform, wherein each level of the multi-level transform comprises a description generation operation and variable support filters for compaction, wherein one level of the transform generates descriptions from input data and compacts the input data by filtering within the generated descriptions and wherein the one level skips over a first number of description boundaries when compacting the input data and wherein a subsequent level skips over a second number of description boundaries and wherein the first number is different from the second number; and means for generating a secondary description corresponding to a primary description, the primary description comprising data output from a final level of the transform and the secondary description comprising an error signal associated with the primary description.

68. The apparatus of claim 67, wherein input data for an initial level is the source data and input data for each subsequent level is data filtered by a previous level.

69. The apparatus of claim 67 further comprising:

means for interleaving the secondary description with a different primary description.

70. An apparatus comprising:

means for receiving a primary description comprising data output from a final level of a multi-level transform, each level of the transform comprises a description generation operation and variable support filters for compaction;

means for generating a secondary description corresponding to a primary description, the secondary description comprising an error signal associated with the primary description, wherein the primary description and the secondary description contain compressed data representing source data and wherein one level of the transform generates descriptions from input data and compacts the input data by filtering within the generated descriptions and wherein the one level skips over a first number of description boundaries when compacting the input data and wherein a subsequent level skips over a second number of description boundaries and wherein the first number is different from the second number; and means for transmitting the secondary description interleaved with a different primary description, wherein the secondary description corresponds to a first portion of the source data and the different primary description corresponds to a different portion of the source data.

71. The apparatus of claim 70 further comprising:

means for estimating the data in an erroneous primary description; and means for combining the error signal in the corresponding secondary description with the estimate to recover the data in the erroneous primary description.

72. An apparatus comprising:

means for determining variable support filtering performed at each level of a multi-level transform to compact data filtered by a previous level;

means for determining description assignment performed at each level; and means for determining an arrangement combining the variable support filtering and the description assignments, wherein an initial level filters source data and an final level generates descriptions containing compressed data representing the source data and further comprising predictor data from each level of the multi-level transform, wherein the descriptions comprise at least a secondary description corresponding to a primary description, the primary description comprising data output from a final level of the transform and the secondary description comprising and error signal associated with the primary description, wherein one level of the transform generates descriptions from input data and compacts the input data by filtering within the generated descriptions and wherein the one level skips over a first number of description boundaries when compacting the input data and wherein a subsequent level skips over a second number of description boundaries and wherein the first number is different from the second number.

* * * * *